United States Patent
Wang

(10) Patent No.: US 10,117,259 B2
(45) Date of Patent: Oct. 30, 2018

(54) SYSTEM, APPARATUS, AND CORRESPONDING METHOD FOR MANAGING RESOURCE IN SHARED NETWORK

(71) Applicant: Huawei Technologies Co., Ltd., Shenzhen, Guangdong (CN)

(72) Inventor: Shuo Wang, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 72 days.

(21) Appl. No.: 15/338,075

(22) Filed: Oct. 28, 2016

(65) Prior Publication Data
US 2017/0048877 A1    Feb. 16, 2017

Related U.S. Application Data

(63) Continuation of application No. PCT/CN2014/076579, filed on Apr. 30, 2014.

(51) Int. Cl.
| | |
|---|---|
| H04W 72/04 | (2009.01) |
| H04W 72/08 | (2009.01) |
| H04W 4/24 | (2018.01) |
| H04W 28/24 | (2009.01) |
| H04M 15/00 | (2006.01) |
| H04L 12/14 | (2006.01) |

(Continued)

(52) U.S. Cl.
CPC ....... *H04W 72/087* (2013.01); *H04L 12/1407* (2013.01); *H04L 12/1432* (2013.01); *H04M 15/66* (2013.01); *H04M 15/8016* (2013.01); *H04W 4/24* (2013.01); *H04W 28/0263* (2013.01); *H04W 28/12* (2013.01); *H04W 28/24* (2013.01); *H04W 72/04* (2013.01)

(58) Field of Classification Search
CPC ...... H04W 72/04; H04W 88/08; H04W 76/00
See application file for complete search history.

(56) References Cited

U.S. PATENT DOCUMENTS

| | | |
|---|---|---|
| 2010/0124926 A1 | 5/2010 | Klatt et al. |
| 2012/0182868 A1 | 7/2012 | Lovsen et al. |

(Continued)

FOREIGN PATENT DOCUMENTS

| | | |
|---|---|---|
| CN | 102098651 A | 6/2011 |
| CN | 102215469 A | 10/2011 |

(Continued)

*Primary Examiner* — Hassan Phillips
*Assistant Examiner* — Prenell Jones

(57) ABSTRACT

A method for managing a resource in a shared network includes: receiving an adjustment request from a PCEF entity, the adjustment request indicates a participant mobile network operator to which user equipment belongs, and requests to adjust a guaranteed bit rate quota and/or a maximum bit rate quota of the participant mobile network operator in the PCEF entity; obtaining, according to the adjustment request, a subscription guaranteed bit rate resource allocated by a primary operator to the participant mobile network operator and a used guaranteed bit rate resource of the participant mobile network operator; and sending an adjustment response to the PCEF entity according to the subscription guaranteed bit rate resource and the used guaranteed bit rate resource, the adjustment response indicates whether the PCEF entity is allowed to adjust the guaranteed bit rate quota and/or the maximum bit rate quota.

20 Claims, 8 Drawing Sheets

(51) Int. Cl.
*H04W 28/12* (2009.01)
*H04W 28/02* (2009.01)

(56) References Cited

U.S. PATENT DOCUMENTS

| | | |
|---|---|---|
| 2013/0303114 A1 | 11/2013 | Ahmad et al. |
| 2014/0141794 A1 | 5/2014 | Smith et al. |
| 2015/0207748 A1 | 7/2015 | Stanwood et al. |

FOREIGN PATENT DOCUMENTS

| | | |
|---|---|---|
| CN | 103370956 A | 10/2013 |
| CN | 103596272 A | 2/2014 |
| CN | 103648088 A | 3/2014 |
| CN | 103650440 A | 3/2014 |
| CN | 103747429 A | 4/2014 |
| CN | 103119981 B | 12/2015 |
| WO | 2010145717 A1 | 12/2010 |

SYSTEM, APPARATUS, AND CORRESPONDING METHOD FOR MANAGING RESOURCE IN SHARED NETWORK

CROSS-REFERENCE TO RELATED APPLICATIONS

This application is a continuation of International Application No. PCT/CN2014/076579, filed on Apr. 30, 2014, the disclosure of which is hereby incorporated by reference in its entirety.

TECHNICAL FIELD

The present invention relates to the field of communications technologies, and specifically, to a system, an apparatus, and a corresponding method for managing a resource in a shared network.

BACKGROUND

With prosperity and development of the telecommunications market, the market of basic telecommunications services continuously expands and becomes mature. How to serve with higher quality and provide more diversified services becomes a weight in competition between operators. Network investment is major expenditure of the operators. Especially nowadays, as mobile network traffic increases sharply, a conventional mobile network operator needs to invest a huge sum of capital to construct and upgrade a network, so that financial pressure is high. By contrast, a mode in which a service can be provided by renting a network has an advantage of cost reduction. Generally, such a manner that a network is shared is referred to as network sharing.

The network sharing may be network sharing between operators, or may be network sharing between an operator and a mobile virtual network operator (MVNO). The mobile virtual network operator generally refers to an operator that does not have an operation license or that needs to use an existing network of a basic mobile network operator (MNO) to develop its own users and provide services to the users as a development scale is limited. A mobile network operator that has an operation license may also rent a network of another mobile network operator to develop its own users and provide services, and may also be considered as a mobile virtual network operator. With enhancement of a network sharing capability, a network of one mobile network operator may serve multiple participant mobile network operators (PMNO, Participant MNO) (that is, basic mobile network operators or mobile virtual network operators). The mobile network operator that serves the multiple participant mobile network operators needs to perform network resource management and control for the participant mobile network operators, to ensure that all the served participant mobile network operators have sufficient network resources to use. In the prior art, when network resource management and control are performed for a participant mobile network operator in a network sharing scenario, the management and control are mainly performed by using a bearer as a granularity, that is, the management and control are performed for a network resource corresponding to each bearer. In addition, a quantity of all resources that can be used by each participant mobile network operator in a policy and charging enforcement function (PCEF) entity and a quantity of all resources that can be used by each participant mobile network operator in a PCRF entity are fixed.

In a process of studying and practicing the prior art, the inventor of the present invention finds that, the prior-art manner of managing a resource in a shared network is not sufficiently flexible and precise, does not have a desirable control effect, and leads to a resource waste.

SUMMARY

Embodiments of the present invention provide a system, an apparatus, and a corresponding method for managing a resource in a shared network, which can perform control for a guaranteed bit rate (GBR) bearer resource in a scenario in which multiple participant mobile network operators share a network, and improve precision and a control effect of resource management, so that a resource in the shared network can be fully used.

According to a first aspect, an embodiment of the present invention provides a method for managing a resource in a shared network, including:

receiving an adjustment request from a PCEF entity, where the adjustment request indicates a participant mobile network operator to which user equipment belongs, and requests to adjust a GBR quota and/or a maximum bit rate (MBR) quota of the participant mobile network operator in the PCEF entity, the MBR quota is a sum of MBR resources that are in the PCEF entity and that can be used by all GBR resource bearers of the participant mobile network operator, and the GBR quota is a sum of GBR resources that are in the PCEF entity and that can be used by all the GBR resource bearers of the participant mobile network operator;

obtaining, according to the adjustment request, a subscription GBR resource allocated by a primary operator to the participant mobile network operator and a used GBR resource of the participant mobile network operator, where the used GBR resource is a sum of GBR resources currently used by all GBR bearers of the participant mobile network operator, and the subscription GBR is a sum of GBR resources that can be used by all the GBR bearers of the participant mobile network operator at any moment; and sending an adjustment response to the PCEF entity according to the subscription GBR resource and the used GBR resource, where the adjustment response indicates whether the PCEF entity is allowed to adjust the GBR quota and/or the MBR quota.

According to a second aspect, an embodiment of the present invention further provides a method for managing a resource in a shared network, including:

sending an adjustment request to a policy and charging rule function (PCRF) entity, where the adjustment request indicates a participant mobile network operator to which user equipment belongs, and requests to adjust a GBR quota and/or an MBR quota of the participant mobile network operator in the PCEF entity, the MBR quota is a sum of quantities of MBR resources that are in the PCEF entity and that can be used by all GBR resource bearers of the participant mobile network operator, and the GBR quota is a sum of GBR resources that are in the PCEF entity and that can be used by all the GBR resource bearers of the participant mobile network operator;

receiving, by the PCEF entity, an adjustment response that is from the PCRF entity according to the adjustment request, where the adjustment response indicates whether the PCEF entity is allowed to adjust the GBR quota and/or the MBR quota; and adjusting, by the PCEF entity, the GBR quota and/or the MBR quota according to the adjustment response.

According to a third aspect, an embodiment of the present invention further provides a system for managing a resource in a shared network, including any PCRF entity and any PCEF entity provided in the embodiments of the present invention.

According to a fourth aspect, an embodiment of the present invention further provides a PCRF entity, including a processor, a transceiver interface, and a memory configured to store data, where the transceiver interface is configured to: receive an adjustment request from a PCEF entity, and provide the adjustment request to the processor, where the adjustment request indicates a participant mobile network operator to which user equipment belongs, and requests to adjust a GBR quota and/or an MBR quota of the participant mobile network operator in the PCEF entity, the MBR quota is a sum of MBR resources that are in the PCEF entity and that can be used by all GBR resource bearers of the participant mobile network operator, and the GBR quota is a sum of GBR resources that are in the PCEF entity and that can be used by all the GBR resource bearers of the participant mobile network operator; and send, under the control of the processor, an adjustment response to the PCEF entity according to subscription GBR resource and used GBR resource, where the adjustment response indicates whether the PCEF entity is allowed to adjust the GBR quota and/or the MBR quota; and the processor is configured to: obtain the subscription GBR resource allocated by a primary operator to the participant mobile network operator and the used GBR resource of the participant mobile network operator, where the used GBR resource is a sum of GBR resources currently used by all GBR bearers of the participant mobile network operator, and the subscription GBR is a sum of GBR resources that can be used by all the GBR bearers of the participant mobile network operator at any moment; and generate the adjustment response according to the subscription GBR resource and the used GBR resource, and control the transceiver interface to send the adjustment response to the PCEF entity.

According to a fifth aspect, an embodiment of the present invention further provides a PCEF entity, including a processor, a transceiver interface, and a memory configured to store data, where the processor is configured to: control the transceiver interface to send an adjustment request to a PCRF entity, where the adjustment request indicates a participant mobile network operator to which user equipment belongs, and requests to adjust a GBR quota and/or an MBR quota of the participant mobile network operator in the PCEF entity, the MBR quota is a sum of quantities of MBR resources that are in the PCEF entity and that can be used by all GBR resource bearers of the participant mobile network operator, and the GBR quota is a sum of GBR resources that are in the PCEF entity and that can be used by all the GBR resource bearers of the participant mobile network operator; and adjust the GBR quota and/or the MBR quota according to an adjustment response received by the transceiver interface; and the transceiver interface is configured to receive the adjustment response that is from the PCRF entity according to the adjustment request, where the adjustment response indicates whether the PCEF entity is allowed to adjust the GBR quota and/or the MBR quota; and provide the adjustment response to the processor.

In the embodiments of the present invention, an adjustment request from a PCEF entity is received, where the adjustment request indicates a participant mobile network operator to which user equipment belongs, and requests to adjust a GBR quota and/or an MBR quota of the participant mobile network operator in the PCEF entity; a subscription GBR resource allocated by a primary operator to the participant mobile network operator and a used GBR resource of the participant mobile network operator are obtained according to the adjustment request; and then an adjustment response is sent to the PCEF entity according to the subscription GBR resource and the used GBR resource, to indicate whether the PCEF entity is allowed to adjust the GBR quota and/or the MBR quota. According to the solution, it can be determined, according to specific statuses of the subscription GBR resource of the participant mobile network operator and the used GBR resource of the participant mobile network operator, whether a GBR quota and/or an MBR quota of the participant mobile network operator in a PCEF entity can be adjusted. Therefore, compared with the prior art in which the GBR quota and/or the MBR quota are fixed, management and control can be performed for a GBR resource more flexibly and precisely, and precision and a control effect of resource management are greatly improved, so that a resource in a shared network can be fully used.

BRIEF DESCRIPTION OF THE DRAWINGS

To describe the technical solutions in the embodiments of the present invention more clearly, the following briefly describes the accompanying drawings required for describing the embodiments or the prior art. Apparently, the accompanying drawings in the following description show merely some embodiments of the present invention, and a person skilled in the art may still derive other drawings from these accompanying drawings without creative efforts.

DETAILED DESCRIPTION

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person skilled in the art based on the embodiments of the present invention without creative efforts shall fall within the protection scope of the present invention.

The embodiments of the present invention provide a system, an apparatus, and a corresponding method for managing a resource in a shared network. Detailed descriptions are provided below separately.

Embodiment 1

Figure 1:
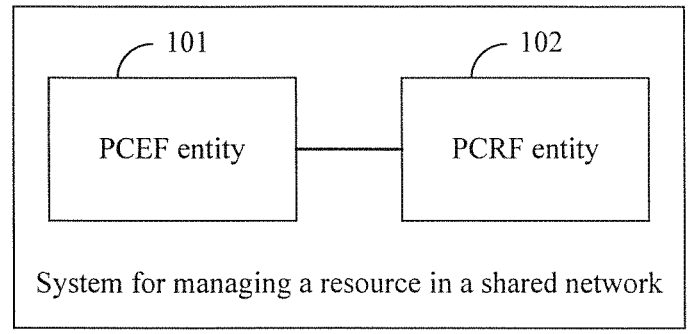
FIG. 1 is a schematic structural diagram of a system for managing a resource in a shared network according to an embodiment of the present invention.

This embodiment of the present invention provides a system for managing a resource in a shared network, which may include any PCEF entity provided in an embodiment of the present invention and any policy and charging rule function (PCRF) entity provided in an embodiment of the present invention. For example, as shown in FIG. 1, the system for managing a resource in a shared network may include a PCEF entity 101 and a PCRF entity 102, which are specifically as follows:

(1) PCEF Entity 101

The PCEF entity 101 is configured to: send an adjustment request to the PCRF entity 102, where the adjustment request indicates a participant mobile network operator to which user equipment belongs, and requests to adjust a GBR quota and/or a maximum bit rate (MBR) quota of the participant mobile network operator in the PCEF entity 101; receive an adjustment response that is from the PCRF entity 102 according to the adjustment request, where the adjustment response indicates whether the PCEF entity 101 is allowed to adjust the GBR quota and/or the MBR quota; and adjust the GBR quota and/or the MBR quota according to the adjustment response.

The MBR quota is a sum of MBR resources that are in the PCEF entity 101 and that can be used by all GBR resource bearers of the participant mobile network operator; and the GBR quota is a sum of GBR resources that are in the PCEF entity 101 and that can be used by all the GBR resource bearers of the participant mobile network operator. The used GBR resource is a sum of GBR resources currently used by all GBR bearers of the participant mobile network operator; and the subscription GBR is a sum of GBR resources that can be used by all the GBR bearers of the participant mobile network operator at any moment. For example, using a participant mobile network operator A as an example, these parameters may be specifically defined as follows:

the MBR quota of the participant mobile network operator in the PCEF entity 101 refers to a sum of MBR resources that are in the PCEF entity 101 and that can be used by all GBR resource bearers of the participant mobile network operator A;

the GBR quota of the participant mobile network operator in the PCEF entity 101 refers to a sum of GBR resources that are in the PCEF entity 101 and that can be used by all the GBR resource bearers of the participant mobile network operator A;

a used GBR resource of the participant mobile network operator A refers to a sum of GBR resources used by all GBR bearers of the participant mobile network operator A; and a subscription GBR of participant mobile network operator A is a sum of GBR resources that can be used by all the GBR bearers of the participant mobile network operator A at any moment.

(2) PCRF Entity 102

The PCRF entity 102 is configured to: receive the adjustment request from the PCEF entity 101, obtain, according to the adjustment request, the subscription GBR resource allocated by a primary operator to the participant mobile network operator and the used GBR resource of the participant mobile network operator, and send the adjustment response to the PCEF entity 101 according to the subscription GBR resource and the used GBR resource, where the adjustment response indicates whether the PCEF entity 101 is allowed to adjust the GBR quota and/or the MBR quota.

For example, when the used GBR resource is less than the subscription GBR resource, the PCRF entity 102 may send, to the PCEF entity 101, an adjustment response indicating that the PCEF entity 101 is allowed to adjust the GBR quota and/or the MBR quota; or when the used GBR resource is equal to the subscription GBR resource, the PCRF entity 102 may send, to the PCEF entity 101, an adjustment response indicating that the PCEF entity 101 is not allowed to adjust the GBR quota and/or the MBR quota.

For different adjustment responses, the PCEF entity 101 executes different adjustment operations. For example, details may be as follows:

if the adjustment response indicates adjustment by the PCEF entity 101 is allowed, the PCEF entity 101 may increase the GBR quota and/or the MBR quota; or if the adjustment response indicates that adjustment by the PCEF entity 101 is not allowed, the PCEF entity 101 adjusts, to a GBR, an actual used bit rate of a GBR bearer whose current actual used bit rate is greater than the GBR; or when the adjustment response indicates that adjustment by the PCEF entity 101 is not allowed, and the PCEF entity 101 determines that a current actual used bit rate of each GBR bearer in the PCEF entity (that is, the PCEF entity 101) has not exceeded a GBR of the GBR bearer corresponding to the GBR bearer, but a sum of the current actual used bit rates of all the GBR bearers has exceeded a second preset threshold, when a new bit rate bearer needs to be established, the PCEF entity 101 preempts a bit rate bearer resource for the new bit rate bearer according to an allocation and retention priority (ARP) parameter.

The second preset threshold may be set according to an actual application requirement, and details are not described herein.

During specific implementation, the PCEF entity 101 may determine, according to usage of a GBR bearer resource of the PCEF entity 101, whether to initiate an adjustment request, that is, before the PCEF entity 101 sends the adjustment request to the PCRF entity 102, the PCEF entity 101 may further execute an operation as follows:

determining that a sum of MBRs currently used by all GBR bearers of the PCEF entity 101 has not exceeded a first preset threshold, and a sum of MBRs currently used by all GMR bearers of the participant mobile network operator in the PCEF entity 101 has reached the MBR quota (that is, the MBR quota of the participant mobile network operator in the PCEF entity 101).

It should be noted that, if the PCEF entity 101 determines that the sum of the MBRs currently used by all the GBR bearers of the PCEF entity 101 has exceeded the first preset threshold, the PCEF entity 101 may adjust, to the GBR quota, a sum of MBRs of all the GBR bearers of the participant mobile network operator to which the user equipment belongs, adjust, to a GBR (that is, a GBR of a GBR bearer), an actual used bit rate of the GBR bearer whose current actual used bit rate is greater than the GBR (that is, the GBR of the GBR bearer), and if a current actual used bit rate of each GBR bearer has not exceeded a GBR corresponding to the GBR bearer (that is, a GBR of the GBR bearer), but a sum of the current actual used bit rates of all the GBR bearers has exceeded the second preset threshold, when a new GBR bearer needs to be established, preempt a bit rate bearer resource for the new GBR bearer according to an ARP parameter.

The first preset threshold may be set according to an actual application requirement, and details are not described herein.

After adjusting the GBR quota and/or the MBR quota, the PCEF entity may perform management and control for a GBR bearer of the participant mobile network operator according to the GBR quota and/or the MBR quota, for example, according to the adjusted GBR quota and/or MBR quota, determine whether establishment of a new GBR bearer is allowed, and how to allocate a GBR bearer resource to the new GBR bearer. Details are not described herein.

In addition, the PCRF entity 102 further needs to collect usage of a GBR resource in each PCEF entity 101, to determine the used GBR resource of the participant mobile network operator, where the usage of the GBR resource may be actively obtained by the PCRF entity 102, or may be obtained through statistics collection according to session establishment and modification and other statuses of the PCEF entity 101. That is, before the PCEF entity 101 sends the adjustment request to the PCRF entity 102, based on different scenarios, the PCEF entity 101 and the PCRF entity 102 may further execute operations as follows:

(1) In a case in which the PCEF entity 101 initiates a session termination procedure:

The PCEF entity 101 may be further configured to receive a session termination request from the user equipment, and send a session termination indication to the PCRF entity according to the session termination request, where the session termination indication carries a user identifier of the user equipment and guaranteed bit rate bearer information.

The PCRF entity 102 may be further configured to: receive the session termination indication from the PCEF entity 101, determine, according to the user identifier of the user equipment, the participant mobile network operator to which the user equipment belongs, and update, according to the GBR bearer information, the used GBR resource of the participant mobile network operator to which the user equipment belongs.

For example, using an Internet Protocol connectivity access network (IP-CAN) session as an example, the operations may be specifically as follows:

The PCEF entity 101 may be specifically configured to receive an IP-CAN session termination request from the user equipment, and send an IP-CAN session termination indication to the PCRF entity according to the session termination request, where the IP-CAN session termination indication carries a user identifier of the user equipment and GBR bearer information.

The PCRF entity 102 may be further configured to: receive the IP-CAN session termination indication from the PCEF entity 101, determine, according to the user identifier of the user equipment, the participant mobile network operator to which the user equipment belongs, and update, according to the GBR bearer information, the used GBR resource of the participant mobile network operator to which the user equipment belongs.

The user identifier of the user equipment may be an international mobile subscriber identification number (IMSI), a mobile subscriber identification number (MSIN), or the like. A corresponding identifier such as a participant mobile network operator identity (PMNO ID, Participant MNO Identity) or an access point name (APN) may be found through search according to the user identifier, to determine the participant mobile network operator to which the user equipment belongs.

The GBR bearer information may include a bearer quantity and type, for example, whether a bearer is a GBR bearer or a non-GBR bearer, and if the bearer is a GBR bearer, may include a specific value of a parameter such as a GBR and/or an MBR.

(2) In a case in which the PCEF entity initiates a session modification procedure:

The PCEF entity 101 may be further configured to: send a session modification indication to the PCRF entity 102, where for ease of description, the session modification indication is referred to as a first session modification indication in this embodiment of the present invention, and receive a first session modification response that is returned by the PCRF entity 102 and that includes a new policy and charging control (PCC) rule; and modify a current GBR bearer according to the new PCC rule, and send a first session modification result notification to the PCRF entity 102, where the first session modification result notification carries a user identifier of the user equipment and GBR bearer information.

The PCRF entity 102 may be further configured to: receive the first session modification indication from the PCEF entity 101, set the new PCC rule according to the first session modification indication, and return, to the PCEF entity 101, the first session modification response carrying the new PCC rule; and receive the first session modification result notification from the PCEF entity 101, determine, according to the user identifier of the user equipment carried in the first session modification result notification, the participant mobile network operator to which the user equipment belongs, and update, according to the GBR bearer information carried in the first session modification result notification, the used GBR resource of the participant mobile network operator to which the user equipment belongs.

For example, using an IP-CAN session as an example, the operations may be specifically as follows:

The PCEF entity 101 may be specifically configured to: send an IP-CAN session modification indication to the PCRF entity 102, and receive an IP-CAN session modification response that is returned by the PCRF entity 102 and that includes a new PCC rule; and modify a current GBR bearer according to the new PCC rule, and send, to the PCRF entity 102, an IP-CAN session modification result notification carrying a user identifier of the user equipment and GBR bearer information.

The PCRF entity 102 may be specifically configured to: receive the IP-CAN session modification indication from the PCEF entity 101, set the new PCC rule according to the IP-CAN session modification indication, and return, to the PCEF entity 101, the IP-CAN session modification response carrying the new PCC rule; and receive the IP-CAN session modification result notification from the PCEF entity 101, determine, according to the user identifier of the user equipment carried in the IP-CAN session modification result notification, the participant mobile network operator to which the user equipment belongs, and update, according to the GBR bearer information carried in the IP-CAN session modification result notification, the used GBR resource of the participant mobile network operator to which the user equipment belongs.

The first session modification indication is used to indicate establishment, deletion, update, or the like of a GBR bearer. The operation of modifying, by the PCEF entity 101, a current bearer according to the new PCC rule may be specifically as follows:

if the first session modification response indicates that a GBR bearer can be established, executing a GBR bearer establishment procedure according to the new PCC rule; or if the first session modification response indicates that a GBR bearer can be deleted, executing a GBR bearer deletion procedure according to the new PCC rule; or if the first session modification response indicates that a GBR bearer can be updated, when it is determined that a bearer service quality parameter does not need to be updated, executing a GBR bearer update procedure according to the new PCC rule; or if the first session modification response indicates that a GBR bearer can be established when it is determined that the allocation and retention priority ARP parameter included in the new PCC rule enables the user equipment to preempt an existing bearer resource and an MBR of a required bearer resource is less than an MBR of the preempted bearer resource, when it is determined that the ARP parameter included in the new PCC rule enables the user equipment to preempt an existing bearer resource and an MBR of a required bearer resource is less than an MBR of the preempted bearer resource, executing a GBR bearer establishment procedure, or otherwise, rejecting GBR bearer establishment; or if the first session modification response indicates that a GBR bearer can be updated when it is determined that a bearer service quality parameter does not need to be updated and an MBR is not to be increased, when it is determined that a bearer service quality parameter does not need to be updated and an MBR is not to be increased, executing a bearer update procedure according to the new PCC rule.

The user identifier of the user equipment may be an IMSI, an MSIN, or the like. A corresponding identifier such as a PMNO ID or an APN may be found through search according to the user identifier, to determine the participant mobile network operator to which the user equipment belongs.

The GBR bearer information may include a bearer quantity and type, for example, whether a bearer is a GBR bearer or a non-GBR bearer, and if the bearer is a GBR bearer, may include a specific value of a parameter such as a GBR and/or an MBR.

(3) In a case in which the PCRF entity initiates a session modification procedure:

The PCRF entity 102 may be further configured to: set a new PCC rule according to a current network status, and send, to the PCEF entity 101, a session modification indication carrying the new PCC rule (for ease of description, the session modification indication is referred to as a second session modification indication in this embodiment of the present invention), so that the PCEF entity 101 modifies a current GBR bearer according to the new PCC rule; receive a second session modification result notification from the PCEF entity 101; determine, according to a user identifier of the user equipment carried in the second session modification result notification, the participant mobile network operator to which the user equipment belongs; and update, according to GBR bearer information carried in the second session modification result notification, the used GBR resource of the participant mobile network operator to which the user equipment belongs.

The PCEF entity 101 may be further configured to: receive the second session modification indication that is from the PCRF entity 102 and that carries the new PCC rule, modify the current bearer according to the new PCC rule, and send the second session modification result notification to the PCRF entity 102, where the second session modification result notification carries the user identifier of the user equipment and the GBR bearer information.

The second session modification indication is used to indicate establishment, deletion, update, or the like of a GBR bearer. The operation of modifying, by the PCEF entity 101, a current bearer according to the new PCC rule may be specifically as follows:

if the second session modification indication indicates that a GBR bearer can be established, executing a GBR bearer establishment procedure according to the new PCC rule; or if the second session modification indication indicates that a GBR bearer can be deleted, executing a GBR bearer deletion procedure according to the new PCC rule; or if the second session modification indication indicates that a GBR bearer can be updated, when it is determined that a bearer service quality parameter does not need to be updated, executing a GBR bearer update procedure according to the new PCC rule; or if the second session modification indication indicates that a GBR bearer can be established when it is determined that the allocation and retention priority ARP parameter included in the new PCC rule enables the user equipment to preempt an existing bearer resource and an MBR of a required bearer resource is less than an MBR of the preempted bearer resource, when it is determined that the ARP parameter included in the new PCC rule enables the user equipment to preempt an existing bearer resource and an MBR of a required bearer resource is less than an MBR of the preempted bearer resource, executing a GBR bearer establishment procedure, or otherwise, rejecting GBR bearer establishment; or if the second session modification indication indicates that a GBR bearer can be updated when it is determined that a bearer service quality parameter does not need to be updated and an MBR is not to be increased, when it is determined that a bearer service quality parameter does not need to be updated and an MBR is not to be increased, executing a GBR bearer update procedure according to the new PCC rule.

The user identifier of the user equipment may be an IMSI, an MSIN, or the like. A corresponding identifier such as a PMNO ID or an APN may be found through search according to the user identifier, to determine the participant mobile network operator to which the user equipment belongs.

The GBR bearer information may include a bearer quantity and type, for example, whether a bearer is a GBR bearer or a non-GBR bearer, and if the bearer is a GBR bearer, may include a specific value of a parameter such as a GBR and/or an MBR.

The PCEF entity 101 may be implemented as an independent entity, or may be integrated in a gateway, for example, a device such as a packet data network gateway (P-GW).

In addition, the system for managing a resource in a shared network may further include the user equipment, which is as follows:

the user equipment is configured to send the session termination request to the PCEF entity 101, and receive a session termination response returned by the PCEF entity 101; or the user equipment is configured to send the session modification request to the PCEF entity 101, and receive a session modification response returned by the PCEF entity 101.

It should be noted that, the system for managing a resource in a shared network may further include another device, such as a radio access network (RAN) device or a mobility management entity (MME). Details are not described herein.

It can be seen from above that, in the system for managing a resource in a shared network in this embodiment, the PCEF entity 101 sends an adjustment request, where the adjustment request indicates a participant mobile network operator to which user equipment belongs, and requests to adjust a GBR quota and/or an MBR quota of the participant mobile network operator in the PCEF entity; and then the PCRF entity 102 obtains, according to the adjustment request, a subscription GBR resource allocated by a primary operator to the participant mobile network operator and a used GBR resource of the participant mobile network operator, and then sends an adjustment response to the PCEF entity 101 according to the subscription GBR resource and the used GBR resource, to indicate whether the PCEF entity 101 is allowed to adjust the GBR quota and/or the MBR quota. According to the solution, it can be determined, according to specific statuses of the subscription GBR resource of the participant mobile network operator and the used GBR resource of the participant mobile network operator, whether a GBR quota and/or an MBR quota of the participant mobile network operator in a PCEF entity can be adjusted. Therefore, compared with the prior art in which the GBR quota and/or the MBR quota are fixed, management and control can be performed for a GBR resource more flexibly and precisely, and precision and a control effect of resource management are greatly improved, so that a resource in a shared network can be fully used.

Embodiment 2

Figure 2A:
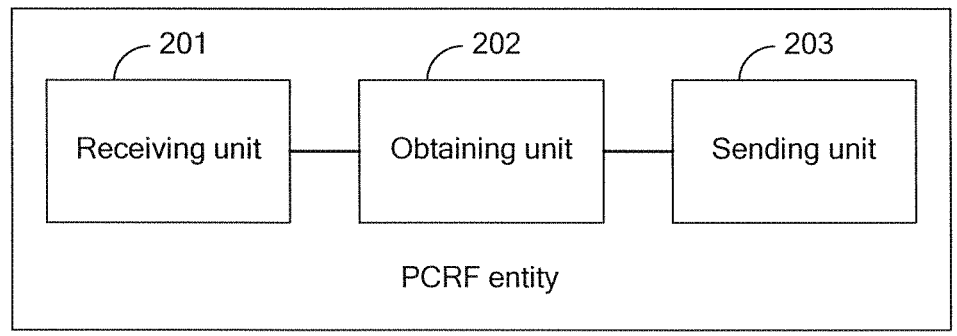
FIG. 2a is a schematic structural diagram of a PCRF entity according to an embodiment of the present invention.

Correspondingly, this embodiment of the present invention further provides a policy and charging rule function entity, that is, a PCRF entity. As shown in FIG. 2*a*, the PCRF entity includes a receiving unit 201, an obtaining unit 202, and a sending unit 203, which are as follows:

The receiving unit 201 is configured to receive an adjustment request from a PCEF entity, where the adjustment request indicates a participant mobile network operator to which user equipment belongs, and requests to adjust a GBR quota and/or an MBR quota of the participant mobile network operator in the PCEF entity.

The MBR quota is a sum of MBR resources that are in the PCEF entity and that can be used by all GBR resource bearers of the participant mobile network operator; and the GBR quota is a sum of GBR resources that are in the PCEF entity and that can be used by all the GBR resource bearers of the participant mobile network operator.

The obtaining unit 202 is configured to obtain, according to the adjustment request received by the receiving unit 201, a subscription GBR resource allocated by a primary operator to the participant mobile network operator and a used GBR resource of the participant mobile network operator.

The used GBR resource is a sum of GBR resources currently used by all GBR bearers of the participant mobile network operator; and the subscription GBR is a sum of GBR resources that can be used by all the GBR bearers of the participant mobile network operator at any moment.

The sending unit 203 is configured to send an adjustment response to the PCEF entity according to the subscription GBR resource and the used GBR resource that are obtained by the obtaining unit 202, where the adjustment response indicates whether the PCEF entity is allowed to adjust the GBR quota and/or the MBR quota.

For example, the sending unit 203 may be specifically configured to: when the used GBR resource is less than the subscription GBR resource, send, to the PCEF entity, an adjustment response indicating that the PCEF entity is allowed to adjust the GBR quota and/or the MBR quota; or when the used GBR resource is equal to the subscription GBR resource, send, to the PCEF entity, an adjustment response indicating that the PCEF entity is not allowed to adjust the GBR quota and/or the MBR quota.

Figure 2B:
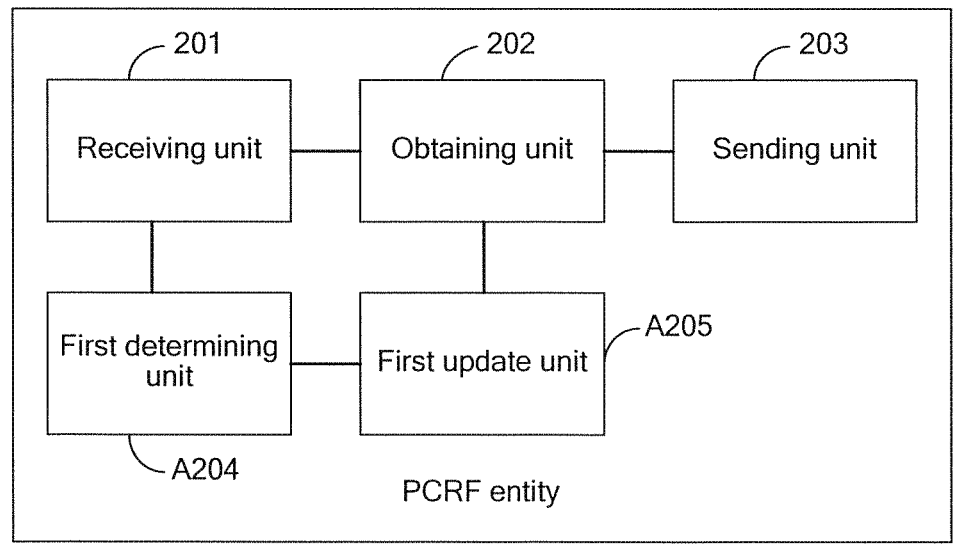
FIG. 2b is another schematic structural diagram of a PCRF entity according to an embodiment of the present invention.

In addition, the PCRF entity further needs to collect usage of a GBR resource in each PCEF entity, to determine the used GBR resource of the participant mobile network operator, where the usage of the GBR resource may be actively obtained by the PCRF entity, or may be obtained through statistics collection according to session establishment and modification and other statuses of the PCEF entity. For example, details may be as follows:

(1) In a case in which the PCEF entity 101 initiates a session termination procedure:

As shown in FIG. 2*b*, the PCRF entity may further include a first determining unit A204 and a first update unit A205, which are as follows:

The receiving unit 201 may be further configured to receive a session termination indication from the PCEF entity, where the session termination indication carries a user identifier of the user equipment and GBR bearer information.

The user identifier of the user equipment may be an IMSI, an MSIN, or the like. A corresponding identifier such as a PMNO ID or an APN may be found through search according to the user identifier, to determine the participant mobile network operator to which the user equipment belongs.

The GBR bearer information may include a bearer quantity and type, for example, whether a bearer is a GBR bearer or a non-GBR bearer, and if the bearer is a GBR bearer, may include a specific value of a parameter such as a GBR and/or an MBR.

The first determining unit A204 may be configured to determine, according to the user identifier of the user equipment, the participant mobile network operator to which the user equipment belongs.

The first update unit A205 may be configured to update, according to the GBR bearer information, the used GBR resource of the participant mobile network operator to which the user equipment belongs.

Figure 2C:
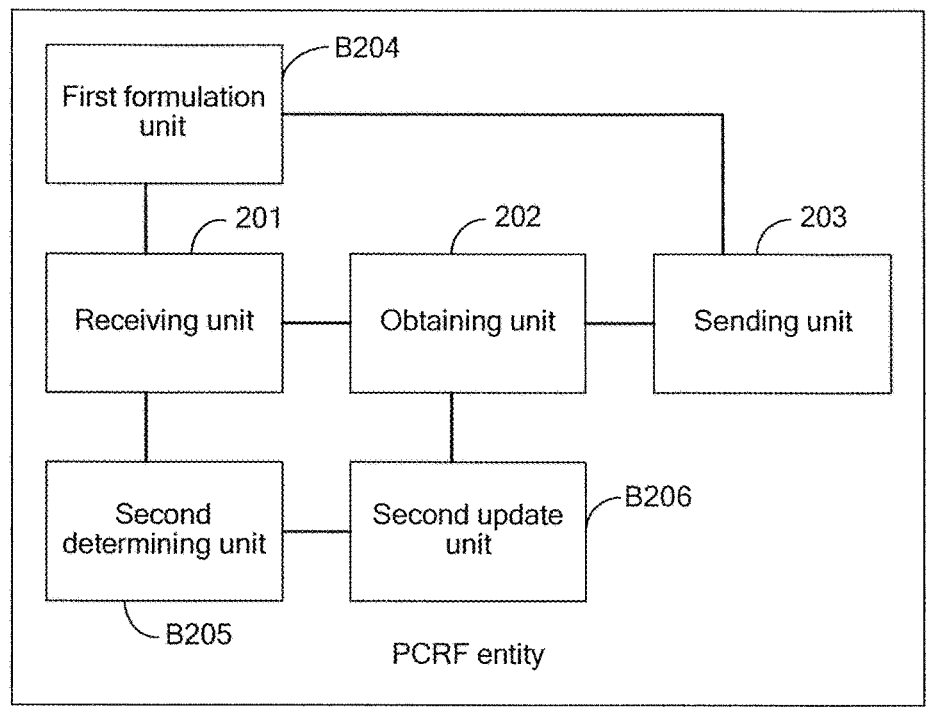
FIG. 2c is still another schematic structural diagram of a PCRF entity according to an embodiment of the present invention.

(2) In a case in which the PCEF entity initiates a session modification procedure:

As shown in FIG. 2c, the PCRF entity may further include a first setting unit B204, a second determining unit B205, and a second update unit B206, which are as follows:

The receiving unit 201 may be further configured to receive a first session modification indication from the PCEF entity.

The first setting unit B204 may be configured to set a new PCC rule according to the first session modification indication received by the receiving unit 201.

The sending unit 203 may be further configured to return, to the PCEF entity, a first session modification response carrying the new PCC rule, so that the PCEF entity modifies a current GBR bearer according to the new PCC rule.

The receiving unit 201 may be further configured to receive a first session modification result notification from the PCEF entity, where the first session modification result notification carries a user identifier of the user equipment and GBR bearer information.

The user identifier of the user equipment may be an IMSI, an MSIN, or the like. A corresponding identifier such as a PMNO ID or an APN may be found through search according to the user identifier, to determine the participant mobile network operator to which the user equipment belongs.

The GBR bearer information may include a bearer quantity and type, for example, whether a bearer is a GBR bearer or a non-GBR bearer, and if the bearer is a GBR bearer, may include a specific value of a parameter such as a GBR and/or an MBR.

The second determining unit B205 may be configured to determine, according to the user identifier of the user equipment, the participant mobile network operator to which the user equipment belongs.

The second update unit B206 may be configured to update, according to the GBR bearer information, the used GBR resource of the participant mobile network operator to which the user equipment belongs.

Figure 2D:
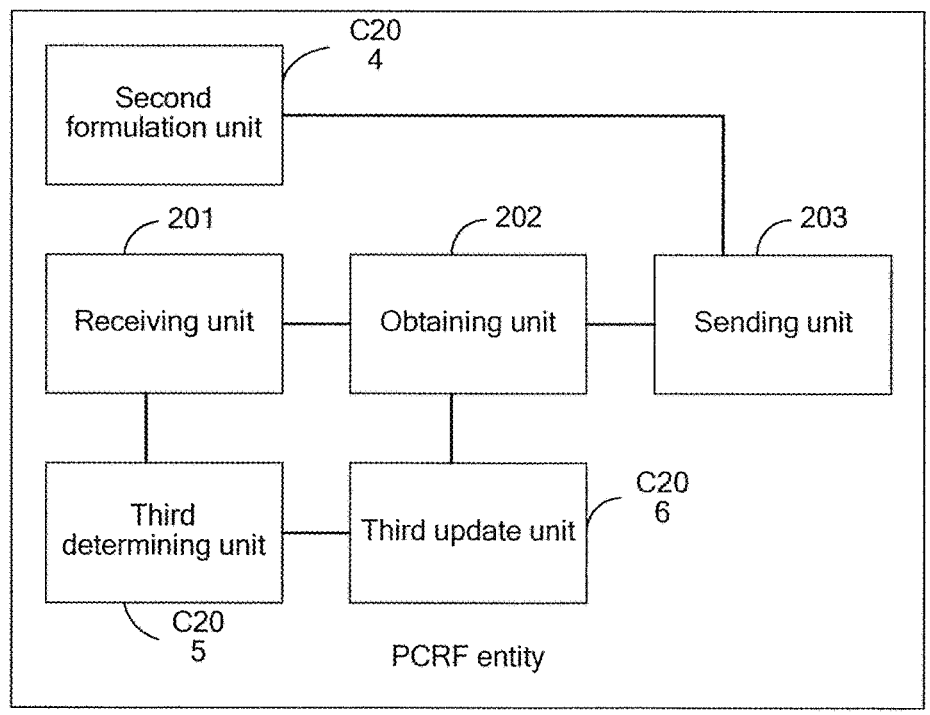
FIG. 2d is still another schematic structural diagram of a PCRF entity according to an embodiment of the present invention.

(3) In a case in which the PCRF entity initiates a session modification procedure:

As shown in FIG. 2d, the PCRF entity may further include a second setting unit C204, a third determining unit C205, and a third update unit C206, which are as follows:

The second setting unit C204 may be configured to set a new PCC rule according to a current network status.

The sending unit 203 may be further configured to send, to the PCEF entity, a second session modification indication carrying the new PCC rule, so that the PCEF entity modifies a current GBR bearer according to the new PCC rule.

The receiving unit 201 may be further configured to receive a second session modification result notification from the PCEF entity, where the second session modification result notification carries a user identifier of the user equipment and GBR bearer information.

The user identifier of the user equipment may be an IMSI, an MSIN, or the like. A corresponding identifier such as a PMNO ID or an APN may be found through search according to the user identifier, to determine the participant mobile network operator to which the user equipment belongs.

The GBR bearer information may include a bearer quantity and type, for example, whether a bearer is a GBR bearer or a non-GBR bearer, and if the bearer is a GBR bearer, may include a specific value of a parameter such as a GBR and/or an MBR.

The third determining unit C205 may be configured to determine, according to the user identifier of the user equipment, the participant mobile network operator to which the user equipment belongs.

The third update unit C206 may be configured to update, according to the GBR bearer information, the used GBR resource of the participant mobile network operator to which the user equipment belongs.

During specific implementation, the units may be implemented as independent units, or may be combined arbitrarily to be implemented as one or more entities. For specific implementation of the units, refer to other embodiments. Details are not described herein.

It can be seen from above that, in the PCRF entity in this embodiment, the receiving unit 201 may receive an adjustment request from a PCEF entity, where the adjustment request indicates a participant mobile network operator to which user equipment belongs, and requests to adjust a GBR quota and/or an MBR quota of the participant mobile network operator in the PCEF entity, then the obtaining unit 202 obtains, according to the adjustment request, a subscription GBR resource allocated by a primary operator to the participant mobile network operator and a used GBR resource of the participant mobile network operator, and then the sending unit 203 sends an adjustment response to the PCEF entity according to the subscription GBR resource and the used GBR resource, to indicate whether the PCEF entity is allowed to adjust the GBR quota and/or the MBR quota. According to the solution, it can be determined, according to specific statuses of the subscription GBR resource of the participant mobile network operator and the used GBR resource of the participant mobile network operator, whether a GBR quota and/or an MBR quota of the participant mobile network operator in a PCEF entity can be adjusted. Therefore, compared with the prior art in which the GBR quota and/or the MBR quota are fixed, management and control can be performed for a GBR resource more flexibly and precisely, and precision and a control effect of resource management are greatly improved, so that a resource in a shared network can be fully used.

Embodiment 3

Figure 3A:
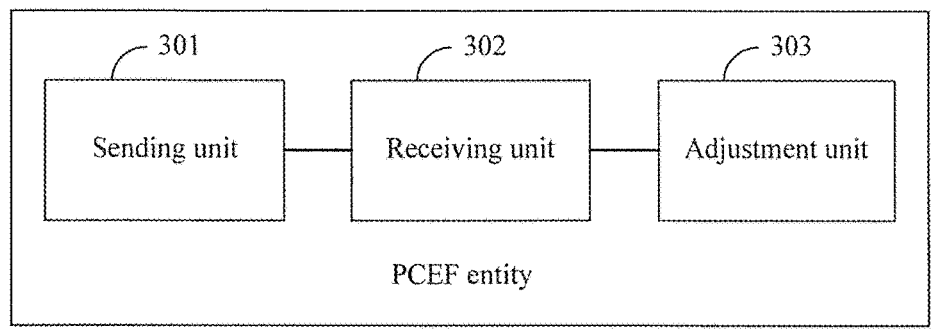
FIG. 3a is a schematic structural diagram of a PCEF entity according to an embodiment of the present invention.

Correspondingly, this embodiment of the present invention further provides a policy and charging enforcement function entity, that is, a PCEF entity. As shown in FIG. 3a, the PCEF entity includes a sending unit 301, a receiving unit 302, and an adjustment unit 303, which are as follows:

The sending unit 301 is configured to send an adjustment request to a PCRF entity, where the adjustment request indicates a participant mobile network operator to which user equipment belongs, and requests to adjust a GBR quota and/or an MBR quota of the participant mobile network operator in the policy and charging enforcement function PCEF entity.

The MBR quota is a sum of MBR resources that are in the PCEF entity and that can be used by all GBR resource bearers of the participant mobile network operator; and the GBR quota is a sum of GBR resources that are in the PCEF entity and that can be used by all the GBR resource bearers of the participant mobile network operator.

The receiving unit 302 is configured to receive an adjustment response that is from the PCRF entity according to the adjustment request, where the adjustment response indicates whether the PCEF entity is allowed to adjust the GBR quota and/or the MBR quota.

The adjustment unit 303 is configured to adjust, according to the adjustment response, the GBR quota and/or the MBR quota of the participant mobile network operator to which the user equipment belongs in the PCEF entity. For example, details may be as follows:

if the adjustment response indicates adjustment by the PCEF entity is allowed, the adjustment unit 303 may increase the GBR quota and/or the MBR quota; or if the adjustment response indicates that adjustment by the PCEF entity is not allowed, the adjustment unit 303 adjusts, to a GBR (that is, a GBR of a GBR bearer), an actual used bit rate of the GBR bearer whose current actual used bit rate is greater than the GBR (that is, the GBR of the GBR bearer); or if the adjustment response indicates that adjustment by the PCEF entity is not allowed, and it is determined that a current actual used bit rate of each GBR bearer in the PCEF entity has not exceeded a GBR corresponding to the GBR bearer (that is, a GBR of the GBR bearer), but a sum of the current actual used bit rates of all the GBR bearers has exceeded a second preset threshold, when a new bit rate bearer needs to be established, the adjustment unit 303 preempts a bit rate bearer resource for the new bit rate bearer according to an ARP parameter.

The second preset threshold may be set according to an actual application requirement, and details are not described herein.

After adjusting the GBR quota and/or the MBR quota, the PCEF entity may perform management and control for a GBR bearer of the participant mobile network operator according to the GBR quota and/or the MBR quota, for example, according to the adjusted GBR quota and/or MBR quota, determine whether establishment of a new GBR bearer is allowed, and how to allocate a GBR bearer resource to the new GBR bearer. Details are not described herein.

Figure 3B:
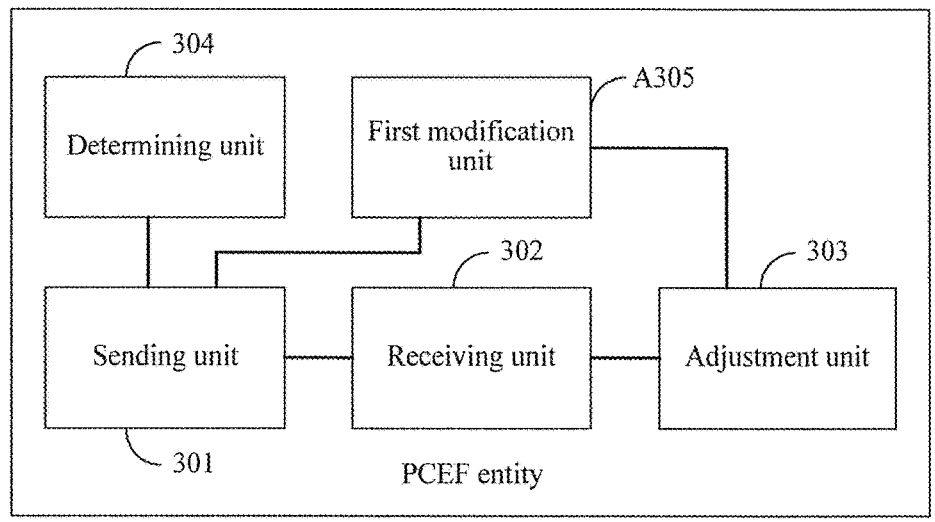
FIG. 3b is still another schematic structural diagram of a PCEF entity according to an embodiment of the present invention.

During specific implementation, the PCEF entity 101 may determine, according to usage of a GBR bearer resource of the PCEF entity 101, whether to initiate an adjustment request, that is, as shown in FIG. 3b, the PCEF entity may further include a determining unit 304, where the determining unit 304 is configured to determine that a sum of MBRs currently used by all GBR bearers of the PCEF entity has not exceeded a first preset threshold, and a sum of MBRs currently used by all the GBR bearers of the participant mobile network operator in the PCEF entity has reached the MBR quota (that is, the MBR quota of the participant mobile network operator in the PCEF entity 101), and trigger the sending unit 301 to send the adjustment request to the PCRF entity.

It should be noted that, if the determining unit 304 determines that the sum of the MBRs currently used by all the GBR bearers of the PCEF entity has exceeded the first preset threshold, the determining unit 304 may trigger the adjustment unit 303 to adjust, to the GBR quota, a sum of MBRs of all the GBR bearers of the participant mobile network operator to which the user equipment belongs, and adjust, to a GBR (that is, a GBR of a GBR bearer), an actual used bit rate of the GBR bearer whose current actual used bit rate is greater than the GBR (that is, the GBR of the GBR bearer); and if the determining unit 304 determines that the sum of the MBRs currently used by all the GBR bearers of the PCEF entity has exceeded the first preset threshold, a current actual used bit rate of each GBR bearer has not exceeded a GBR corresponding to the GBR bearer (that is, a GBR of the GBR bearer), and a sum of the current actual used bit rates of all the GBR bearers has exceeded the second preset threshold, the determining unit 304 triggers the adjustment unit 303 to: when a new GBR bearer needs to be established, preempt a bit rate bearer resource for the new GBR bearer according to an ARP parameter. That is, the adjustment unit 303 may be further configured to: when it is determined that the sum of the MBRs currently used by all the GBR bearers of the PCEF entity has exceeded the first preset threshold, adjust, to the GBR quota, a sum of MBRs of all the GBR bearers of the participant mobile network operator to which the user equipment belongs, adjust, to a GBR, an actual used bit rate of a GBR bearer whose current actual used bit rate is greater than the GBR, and if a current actual used bit rate of each GBR bearer has not exceeded a GBR corresponding to the GBR bearer, but a sum of the current actual used bit rates of all the GBR bearers has exceeded a second preset threshold, when a new GBR bearer needs to be established, preempt a bit rate bearer resource for the new GBR bearer according to an ARP parameter.

In addition, before sending the adjustment request to the PCRF entity, the PCEF entity may further provide the usage of the GBR resource of the PCEF entity to the PCRF entity, so that the PCRF entity collects statistics, to determine a used GBR resource of the participant mobile network operator. Details may be as follows:

(1) In a case in which the PCEF entity 101 initiates a session termination procedure:

The receiving unit 302 may be further configured to receive a session termination request from the user equipment.

The sending unit 301 may be further configured to send a session termination indication to the PCRF entity according to the session termination request, where the session termination indication carries a user identifier of the user equipment and GBR bearer information.

The user identifier of the user equipment may be an IMSI, an MSIN, or the like. A corresponding identifier such as a PMNO ID or an APN may be found through search according to the user identifier, to determine the participant mobile network operator to which the user equipment belongs.

The GBR bearer information may include a bearer quantity and type, for example, whether a bearer is a GBR bearer or a non-GBR bearer, and if the bearer is a GBR bearer, may include a specific value of a parameter such as a GBR and/or an MBR;

(2) In a case in which the PCEF entity initiates a session modification procedure:

As shown in FIG. 3b, the PCEF entity may further include a first modification unit A305, where the sending unit 301 may be further configured to send a first session modification indication to the PCRF entity;

the receiving unit 302 may be further configured to receive a first session modification response that is returned by the PCRF entity and that includes a new PCC rule, where the new PCC rule is set by the PCRF entity according to the first session modification indication;

the first modification unit A305 is further configured to modify a current GBR bearer according to the new PCC rule; and the receiving unit 301 may be further configured to receive a first session modification result notification from the PCRF entity, where the first session modification result notification carries a user identifier of the user equipment and GBR bearer information.

The user identifier of the user equipment may be an IMSI, an MSIN, or the like. A corresponding identifier such as a PMNO ID or an APN may be found through search according to the user identifier, to determine the participant mobile network operator to which the user equipment belongs.

The GBR bearer information may include a bearer quantity and type, for example, whether a bearer is a GBR bearer or a non-GBR bearer, and if the bearer is a GBR bearer, may include a specific value of a parameter such as a GBR and/or an MBR.

The first session modification indication is used to indicate establishment, deletion, update, or the like of a GBR bearer. The first modification unit A305 may be specifically configured to:

if the first session modification response indicates that a GBR bearer can be established, execute a GBR bearer establishment procedure according to the new PCC rule; or if the first session modification response indicates that a GBR bearer can be deleted, execute a GBR bearer deletion procedure according to the new PCC rule; or if the first session modification response indicates that a GBR bearer can be updated, when it is determined that a bearer service quality parameter does not need to be updated, execute a GBR bearer update procedure according to the new PCC rule; or if the first session modification response indicates that a GBR bearer can be established when it is determined that the allocation and retention priority ARP parameter included in the new PCC rule enables the user equipment to preempt an existing bearer resource and an MBR of a required bearer resource is less than an MBR of the preempted bearer resource, when it is determined that the ARP parameter included in the new PCC rule enables the user equipment to preempt an existing bearer resource and an MBR of a required bearer resource is less than an MBR of the preempted bearer resource, execute a GBR bearer establishment procedure, or otherwise, reject GBR bearer establishment; or if the first session modification response indicates that a GBR bearer can be updated when it is determined that a bearer service quality parameter does not need to be updated and an MBR is not to be increased, when it is determined that a bearer service quality parameter does not need to be updated and an MBR is not to be increased, execute a bearer update procedure according to the new PCC rule.

Figure 3C:
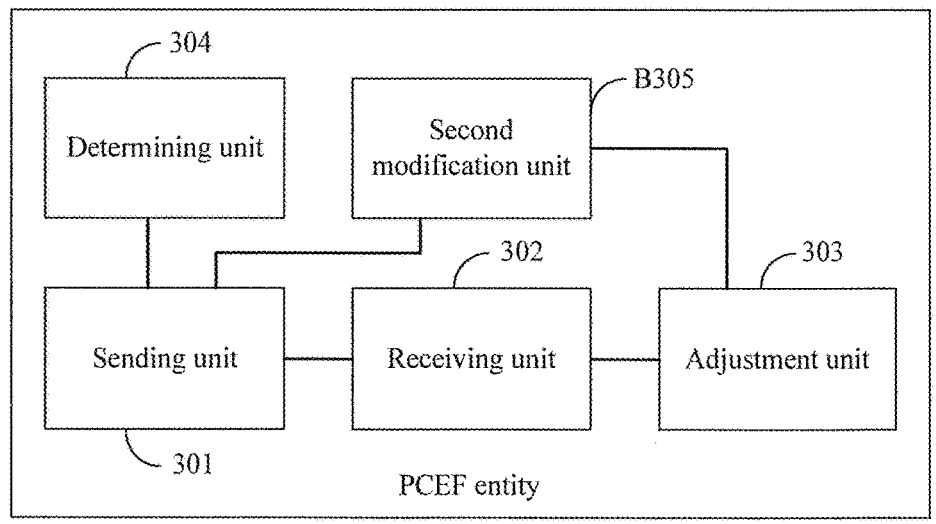
FIG. 3c is still another schematic structural diagram of a PCEF entity according to an embodiment of the present invention.

(3) In a case in which the PCRF entity initiates a session modification procedure:

As shown in FIG. 3c, the PCEF entity may further include a second modification unit B305, where the receiving unit 302 may be further configured to receive a second session modification indication that is from the PCRF entity and that carries a new PCC rule, where the new PCC rule is set by the PCRF entity according to a current network status;

the modification unit B305 may be further configured to modify a current bearer according to the new PCC rule; and the receiving unit 301 may be further configured to receive a second session modification result notification from the PCRF entity, where the second session modification result notification carries a user identifier of the user equipment and GBR bearer information.

The user identifier of the user equipment may be an IMSI, an MSIN, or the like. A corresponding identifier such as a PMNO ID or an APN may be found through search according to the user identifier, to determine the participant mobile network operator to which the user equipment belongs.

The GBR bearer information may include a bearer quantity and type, for example, whether a bearer is a GBR bearer or a non-GBR bearer, and if the bearer is a GBR bearer, may include a specific value of a parameter such as a GBR and/or an MBR.

The second session modification indication is used to indicate establishment, deletion, update, or the like of a GBR bearer. The second modification unit B305 may be specifically configured to:

if the second session modification indication indicates that a GBR bearer can be established, execute a GBR bearer establishment procedure according to the new PCC rule; or if the second session modification indication indicates that a GBR bearer can be deleted, execute a GBR bearer deletion procedure according to the new PCC rule; or if the second session modification indication indicates that a GBR bearer can be updated, when it is determined that a bearer service quality parameter does not need to be updated, execute a GBR bearer update procedure according to the new PCC rule; or if the second session modification indication indicates that a GBR bearer can be established when it is determined that the allocation and retention priority ARP parameter included in the new PCC rule enables the user equipment to preempt an existing bearer resource and an MBR of a required bearer resource is less than an MBR of the preempted bearer resource, when it is determined that the ARP parameter included in the new PCC rule enables the user equipment to preempt an existing bearer resource and an MBR of a required bearer resource is less than an MBR of the preempted bearer resource, execute a GBR bearer establishment procedure, or otherwise, reject GBR bearer establishment; or if the second session modification indication indicates that a GBR bearer can be updated when it is determined that a bearer service quality parameter does not need to be updated and an MBR is not to be increased, when it is determined that a bearer service quality parameter does not need to be updated and an MBR is not to be increased, execute a GBR bearer update procedure according to the new PCC rule.

During specific implementation, the units may be implemented as independent units, or may be combined arbitrarily to be implemented as one or more entities. For specific implementation of the units, refer to other embodiments. Details are not described herein.

In addition, it should be noted that, during specific implementation, the PCEF entity may be implemented as an independent entity, or may be integrated in a gateway, for example, a device such as a P-GW.

It can be seen from above that, in the PCEF entity in this embodiment, the sending unit 301 may send an adjustment request to a PCRF entity, where the adjustment request indicates a participant mobile network operator to which user equipment belongs, and requests to adjust a GBR quota and/or an MBR quota of the participant mobile network operator in the PCEF entity, then the receiving unit 302 receives an adjustment response that is from the PCRF entity according to the adjustment request, and then the adjustment unit 303 adjusts, according to the adjustment response, the GBR quota and/or the MBR quota of the participant mobile network operator to which the user equipment belongs in the PCEF entity. According to the solution, it can be determined, according to specific statuses of the subscription GBR resource of the participant mobile network operator and the used GBR resource of the participant mobile network operator, whether a GBR quota and/or an MBR quota of the participant mobile network operator in a PCEF entity can be adjusted. Therefore, compared with the prior art in which the GBR quota and/or the MBR quota are fixed, management and control can be performed for a GBR resource more flexibly and precisely, and precision and a control effect of resource management are greatly improved, so that a resource in a shared network can be fully used.

Embodiment 4

In addition, this embodiment of the present invention further provides a corresponding method for managing a resource in a shared network, which is described below. In this embodiment, a description is provided from the perspective of a PCRF entity.

A method for managing a resource in a shared network includes: receiving an adjustment request from a PCEF entity, where the adjustment request indicates a participant mobile network operator to which user equipment belongs, and requests to adjust a GBR quota and/or an MBR quota of the participant mobile network operator in the PCEF entity; obtaining, according to the adjustment request, a subscription GBR resource allocated by a primary operator to the participant mobile network operator and a used GBR resource of the participant mobile network operator; and sending an adjustment response to the PCEF entity according to the subscription GBR resource and the used GBR resource, where the adjustment response indicates whether the PCEF entity is allowed to adjust the GBR quota and/or the MBR quota.

Figure 4:
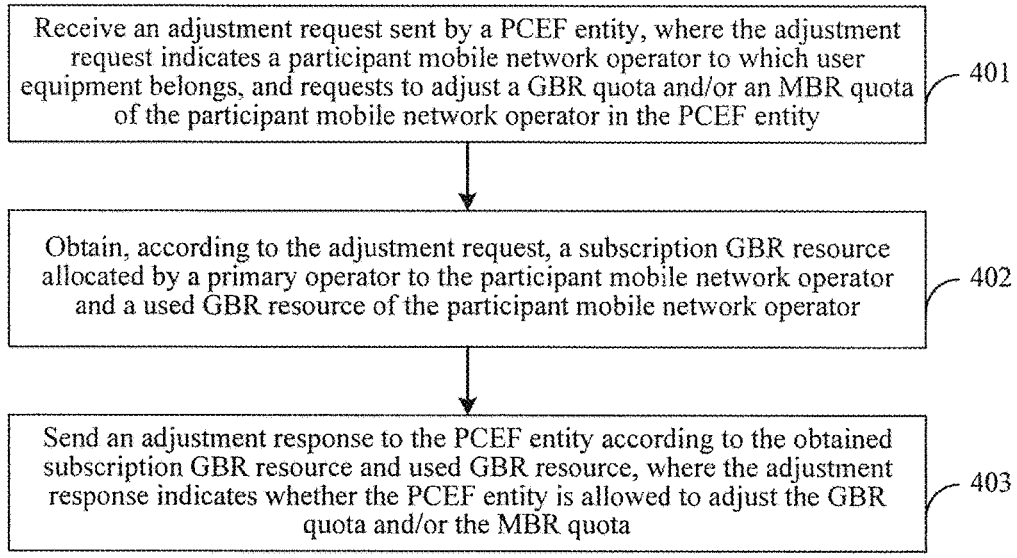
FIG. 4 is a flowchart of a method for managing a resource in a shared network according to an embodiment of the present invention.

As shown in FIG. 4, a specific process may be as follows:

401: Receive an adjustment request from a PCEF entity, where the adjustment request indicates a participant mobile network operator to which user equipment belongs, and requests to adjust a GBR quota and/or an MBR quota of the participant mobile network operator in the PCEF entity.

The MBR quota is a sum of MBR resources that are in the PCEF entity and that can be used by all GBR resource bearers of the participant mobile network operator; and the GBR quota refers to a sum of GBR resources that are in the PCEF entity and that can be used by all the GBR resource bearers of the participant mobile network operator.

402: Obtain, according to the adjustment request, a subscription GBR resource allocated by a primary operator to the participant mobile network operator and a used GBR resource of the participant mobile network operator.

The used GBR resource is a sum of GBR resources currently used by all GBR bearers of the participant mobile network operator, and the subscription GBR is a sum of GBR resources that can be used by all the GBR bearers of the participant mobile network operator at any moment.

It should be noted that, the PCRF entity maintains statuses of a subscription GBR resource (that is, a subscription GBR throughput) of each participant mobile network operator and a used GBR resource (a used GBR throughput) of each participant mobile network operator. That is, in addition to the subscription GBR resource determined through negotiation between the primary operator and each participant mobile network operator, the PCRF further needs to collect usage of a GBR resource in each PCEF entity, to determine the used GBR resource of the participant mobile network operator, where the usage of the GBR resource may be actively obtained by the PCRF entity, or may be obtained through statistics collection according to session establishment and modification and other statuses of the PCEF entity. For example, when a GBR bearer change occurs, for example, a GBR bearer is established, deleted, or updated, a used GBR resource of a participant mobile network operator to which the GBR bearer belongs may change. Therefore, in this case, a status, maintained in the PCRF, of the used GBR resource of the participant mobile network operator may be updated. That is, before the sending an adjustment request to a PCRF entity, based on different scenarios, the method for managing a resource in a shared network may further include any operation as follows:

(1) In a case in which the PCEF entity initiates a session termination procedure:

In this scenario, before the sending an adjustment request to a PCRF entity, steps S001 to S003 may be further performed, which are as follows:

S001: Receive a session termination indication from the PCEF entity, where the session termination indication carries a user identifier of the user equipment and GBR bearer information.

The user identifier of the user equipment may be an IMSI, an MSIN, or the like. A corresponding identifier such as a PMNO ID or an APN may be found through search according to the user identifier, to determine the participant mobile network operator to which the user equipment belongs.

The GBR bearer information may include a bearer quantity and type, for example, whether a bearer is a GBR bearer or a non-GBR bearer, and if the bearer is a GBR bearer, may include a specific value of a parameter such as a GBR and/or an MBR.

S002: Determine, according to the user identifier of the user equipment, the participant mobile network operator to which the user equipment belongs.

For example, a corresponding PMNO ID may be specifically found through search according to the user identifier of the user equipment, and then the participant mobile network operator to which the user equipment belongs is determined according to the found PMNO ID.

S003: Update, according to the GBR bearer information, the used GBR resource of the participant mobile network operator to which the user equipment belongs.

In addition, after the used GBR resource of the participant mobile network operator to which the user equipment belongs is updated according to the GBR bearer information, a session termination response may be further sent to the PCEF entity.

(2) In a case in which the PCEF entity initiates a session modification procedure:

In this scenario, before the sending an adjustment request to a PCRF entity, steps S011 to S016 may be further performed, which are as follows:

S011: Receive a first session modification indication from the PCEF entity.

S012: Set a new PCC rule according to the first session modification indication.

S013: Return, to the PCEF entity, a first session modification response carrying the new PCC rule, so that the PCEF entity modifies a current GBR bearer according to the new PCC rule.

For example, the step "the PCEF entity modifies a current GBR bearer according to the new PCC rule" may be specifically as follows:

if the first session modification response indicates that a GBR bearer can be established, the PCEF entity executes a GBR bearer establishment procedure according to the new PCC rule; or if the first session modification response indicates that a GBR bearer can be deleted, the PCEF entity executes a GBR bearer deletion procedure according to the new PCC rule; or if the first session modification response indicates that a GBR bearer can be updated, when it is determined that a bearer service quality parameter does not need to be updated, the PCEF entity executes a GBR bearer update procedure according to the new PCC rule; or if the first session modification response indicates that a GBR bearer can be established when it is determined that the allocation and retention priority ARP parameter included in the new PCC rule enables the user equipment to preempt an existing bearer resource and an MBR of a required bearer resource is less than an MBR of the preempted bearer resource, when it is determined that the ARP parameter included in the new PCC rule enables the user equipment to preempt an existing bearer resource and an MBR of a required bearer resource is less than an MBR of the preempted bearer resource, the PCEF entity executes a GBR bearer establishment procedure, or otherwise, rejects GBR bearer establishment; or if the first session modification response indicates that a GBR bearer can be updated when it is determined that a bearer service quality parameter does not need to be updated and an MBR is not to be increased, when it is determined that a bearer service quality parameter does not need to be updated and an MBR is not to be increased, the PCEF entity executes a bearer update procedure according to the new PCC rule.

S014: Receive a first session modification result notification from the PCEF entity, where the first session modification result notification carries a user identifier of the user equipment and GBR bearer information.

The user identifier of the user equipment may be an IMSI, an MSIN, or the like. A corresponding identifier such as a PMNO ID or an APN may be found through search according to the user identifier, to determine the participant mobile network operator to which the user equipment belongs.

The GBR bearer information may include a bearer quantity and type, for example, whether a bearer is a GBR bearer or a non-GBR bearer, and if the bearer is a GBR bearer, may include a specific value of a parameter such as a GBR and/or an MBR.

S015: Determine, according to the user identifier of the user equipment, the participant mobile network operator to which the user equipment belongs.

For example, a corresponding PMNO ID may be specifically found through search according to the user identifier of the user equipment, and then the participant mobile network operator to which the user equipment belongs is determined according to the found PMNO ID.

S016: Update, according to the GBR bearer information, the used GBR resource of the participant mobile network operator to which the user equipment belongs.

(3) In a case in which the PCRF entity initiates a session modification procedure:

In this scenario, before the sending an adjustment request to a PCRF entity, steps S021 to S025 may be further performed, which are as follows:

S021: Set a new PCC rule according to a current network status.

S022: Send, to the PCEF entity, a second session modification indication carrying the new PCC rule, so that the PCEF entity may modify a current GBR bearer according to the new PCC rule.

For example, the step "the PCEF entity modifies a current GBR bearer according to the new PCC rule" may be specifically as follows:

if the second session modification indication indicates that a GBR bearer can be established, the PCEF entity executes a GBR bearer establishment procedure according to the new PCC rule; or if the second session modification indication indicates that a GBR bearer can be deleted, the PCEF entity executes a GBR bearer deletion procedure according to the new PCC rule; or if the second session modification indication indicates that a GBR bearer can be updated, when it is determined that a bearer service quality parameter does not need to be updated, the PCEF entity executes a GBR bearer update procedure according to the new PCC rule; or if the second session modification indication indicates that a GBR bearer can be established when it is determined that the allocation and retention priority ARP parameter included in the new PCC rule enables the user equipment to preempt an existing bearer resource and an MBR of a required bearer resource is less than an MBR of the preempted bearer resource, when it is determined that the ARP parameter included in the new PCC rule enables the user equipment to preempt an existing bearer resource and an MBR of a required bearer resource is less than an MBR of the preempted bearer resource, the PCEF entity executes a GBR bearer establishment procedure, or otherwise, rejects GBR bearer establishment; or if the second session modification indication indicates that a GBR bearer can be updated when it is determined that a bearer service quality parameter does not need to be updated and an MBR is not to be increased, when it is determined that a bearer service quality parameter does not need to be updated and an MBR is not to be increased, the PCEF entity executes a GBR bearer update procedure according to the new PCC rule.

S023: Receive a second session modification result notification from the PCEF entity, where the second session modification result notification carries a user identifier of the user equipment and GBR bearer information.

The user identifier of the user equipment may be an IMSI, an MSIN, or the like. A corresponding identifier such as a PMNO ID or an APN may be found through search according to the user identifier, to determine the participant mobile network operator to which the user equipment belongs.

The GBR bearer information may include a bearer quantity and type, for example, whether a bearer is a GBR bearer or a non-GBR bearer, and if the bearer is a GBR bearer, may include a specific value of a parameter such as a GBR and/or an MBR.

S024: Determine, according to the user identifier of the user equipment, the participant mobile network operator to which the user equipment belongs.

For example, a corresponding PMNO ID may be specifically found through search according to the user identifier of the user equipment, and then the participant mobile network operator to which the user equipment belongs is determined according to the found PMNO ID.

S025: Update, according to the GBR bearer information, the used GBR resource of the participant mobile network operator to which the user equipment belongs.

403: Send an adjustment response to the PCEF entity according to the obtained subscription GBR resource and used GBR resource, where the adjustment response indicates whether the PCEF entity is allowed to adjust the GBR quota and/or the MBR quota. For example, details may be as follows:

when the used GBR resource is less than the subscription GBR resource, send, to the PCEF entity, an adjustment response indicating that the PCEF entity is allowed to adjust the GBR quota and/or the MBR quota; or when the used GBR resource is equal to the subscription GBR resource, send, to the PCEF entity, an adjustment response indicating that the PCEF entity is not allowed to adjust the GBR quota and/or the MBR quota.

It can be seen from above that, in this embodiment, an adjustment request from a PCEF entity is received, where the adjustment request indicates a participant mobile network operator to which user equipment belongs, and requests to adjust a GBR quota and/or an MBR quota of the participant mobile network operator in the PCEF entity; a subscription GBR resource allocated by a primary operator to the participant mobile network operator and a used GBR resource of the participant mobile network operator are obtained according to the adjustment request; and then an adjustment response is sent to the PCEF entity according to the subscription GBR resource and the used GBR resource, to indicate whether the PCEF entity is allowed to adjust the GBR quota and/or the MBR quota. According to the solution, it can be determined, according to specific statuses of the subscription GBR resource of the participant mobile network operator and the used GBR resource of the participant mobile network operator, whether a GBR quota and/or an MBR quota of the participant mobile network operator in a PCEF entity can be adjusted. Therefore, compared with the prior art in which the GBR quota and/or the MBR quota are fixed, management and control can be performed for a GBR resource more flexibly and precisely, and precision and a control effect of resource management are greatly improved, so that a resource in a shared network can be fully used.

Embodiment 5

Correspondingly, this embodiment of the present invention further provides another method for managing a resource in a shared network. Different from Embodiment 4, in this embodiment, a description is provided from the perspective of a PCEF entity. The PCEF entity may be implemented as an independent entity, or may be integrated in a gateway, for example, a device such as a P-GW.

A method for managing a resource in a shared network includes: sending, by a PCEF entity, an adjustment request to a PCRF entity, where the adjustment request indicates a participant mobile network operator to which user equipment belongs, and requests to adjust a GBR quota and/or an MBR quota of the participant mobile network operator in the PCEF entity; receiving an adjustment response that is from the PCRF entity according to the adjustment request, where the adjustment response indicates whether the PCEF entity is allowed to adjust the GBR quota and/or the MBR quota; and adjusting the GBR quota and/or the MBR quota according to the adjustment response.

Figure 5:
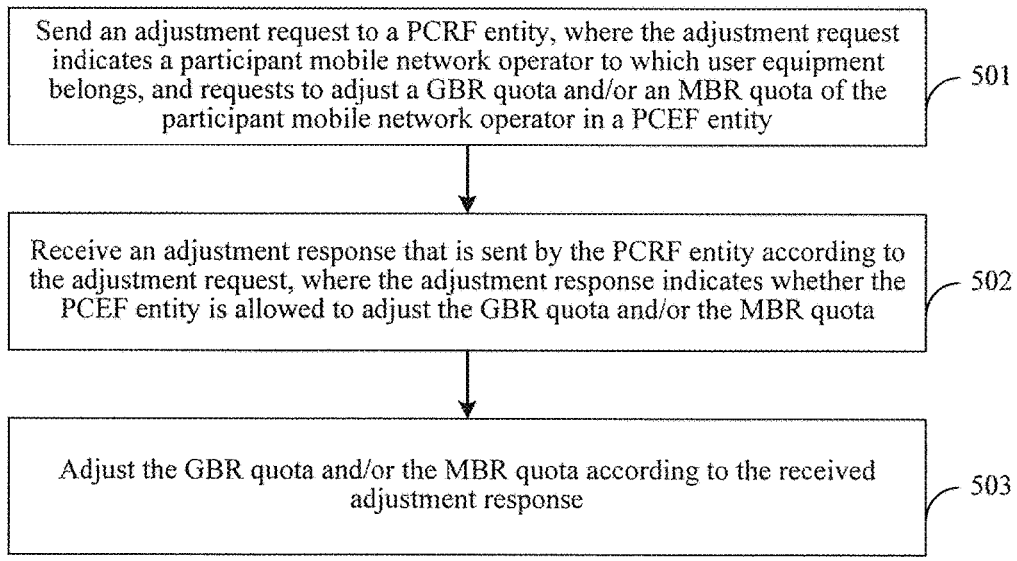
FIG. 5 is another flowchart of a method for managing a resource in a shared network according to an embodiment of the present invention.

As shown in FIG. 5, a specific process may be as follows:

501: A PCEF entity sends an adjustment request to a PCRF entity, where the adjustment request indicates a participant mobile network operator to which user equipment belongs, and requests to adjust a GBR quota and/or an MBR quota of the participant mobile network operator in the PCEF entity.

The MBR quota is a sum of MBR resources that are in the PCEF entity and that can be used by all GBR resource bearers of the participant mobile network operator; and the GBR quota refers to a sum of GBR resources that are in the PCEF entity and that can be used by all the GBR resource bearers of the participant mobile network operator.

During specific implementation, the PCEF entity may determine, according to usage of a GBR bearer resource of the PCEF entity, whether to initiate an adjustment request, that is, before the sending, by a PCEF entity, an adjustment request to a PCRF entity, the method for managing a resource in a shared network may further include:

determining, by the PCEF entity, that a sum of MBRs currently used by all GBR bearers of the PCEF entity has not exceeded a first preset threshold, and a sum of MBRs currently used by all GBR bearers of the participant mobile network operator (that is, the participant mobile network operator to which a user belongs) in the PCEF entity has reached the MBR quota.

It should be noted that, if the PCEF entity determines that the sum of the MBRs currently used by all the GBR bearers of the PCEF entity has exceeded the first preset threshold, the PCEF entity may adjust, to the GBR quota, a sum of MBRs of all the GBR bearers of the participant mobile network operator to which the user equipment belongs, compare an actual used bit rate of each GBR bearer with a GBR corresponding to the GBR bearer (that is, a GBR of the GBR bearer), adjust, to a GBR (that is, a GBR of a GBR bearer), an actual used bit rate of the GBR bearer whose current actual used bit rate is greater than the GBR (that is, the GBR of the GBR bearer), and if the current actual used bit rate of each GBR bearer has not exceeded the GBR corresponding to the GBR bearer (that is, the GBR of the GBR bearer), but a sum of the current actual used bit rates of all the GBR bearers has exceeded a second preset threshold, when a new GBR bearer needs to be established, preempt a bit rate bearer resource for the new GBR bearer according to an ARP parameter.

The first preset threshold and the second preset threshold may be set according to an actual application requirement, and details are not described herein.

502: The PCEF entity receives an adjustment response that is from the PCRF entity according to the adjustment request, where the adjustment response indicates whether the PCEF entity is allowed to adjust the GBR quota and/or the MBR quota.

For details of a method for the PCRF entity to send the adjustment response according to the adjustment request, refer to Embodiment 4, which are not described herein again.

503: The PCEF entity adjusts the GBR quota and/or the MBR quota according to the received adjustment response. For example, details may be specifically as follows:

if the adjustment response indicates adjustment by the PCEF entity is allowed, the PCEF entity increases the GBR quota and/or the MBR quota; or when the adjustment response indicates that adjustment by the PCEF entity is not allowed, the PCEF entity adjusts, to a corresponding GBR, an actual used bit rate of a GBR bearer whose current actual used bit rate is greater than the GBR; or when the adjustment response indicates that adjustment by the PCEF entity is not allowed, and a current actual used bit rate of each GBR bearer in the PCEF entity has not exceeded a GBR corresponding to the GBR bearer, but a sum of the current actual used bit rates of all the GBR bearers has exceeded a second preset threshold, when a new GBR bearer needs to be established, the PCEF entity preempts a bit rate bearer resource for the new GBR bearer according to an ARP parameter.

After adjusting the GBR quota and/or the MBR quota, the PCEF entity may perform management and control for a GBR bearer of the participant mobile network operator according to the GBR quota and/or the MBR quota, for example, according to the adjusted GBR quota and/or MBR quota, determine whether establishment of a new GBR bearer is allowed, and how to allocate a GBR bearer resource to the new GBR bearer. Details are not described herein.

In addition, before sending the adjustment request to the PCRF entity, the PCEF entity may further provide the usage of the GBR resource of the PCEF entity to the PCRF entity, so that the PCRF entity collects statistics, to determine a used GBR resource of the participant mobile network operator. Details may be as follows:

(1) In a case in which the PCEF entity initiates a session termination procedure:

Before the sending, by a PCEF entity, an adjustment request to a PCRF entity, the method for managing a resource in a shared network may further include steps as follows:

Step A1: The PCEF entity receives a session termination request from the user equipment.

Step A2: The PCEF entity sends a session termination indication to the PCRF entity according to the session termination request, where the session termination indication carries a user identifier of the user equipment and GBR bearer information.

The user identifier of the user equipment may be an IMSI, an MSIN, or the like. A corresponding identifier such as a PMNO ID or an APN may be found through search according to the user identifier, to determine the participant mobile network operator to which the user equipment belongs.

The GBR bearer information may include a bearer quantity and type, for example, whether a bearer is a GBR bearer or a non-GBR bearer, and if the bearer is a GBR bearer, may include a specific value of a parameter such as a GBR and/or an MBR.

(2) In a case in which the PCEF entity initiates a session modification procedure:

Before the sending, by a PCEF entity, an adjustment request to a PCRF entity, the method for managing a resource in a shared network may further include steps as follows:

Step B1: The PCEF entity sends a first session modification indication to the PCRF entity.

For example, the PCEF entity may specifically receive a first session modification request from the user equipment, and then send a first session modification indication to the PCRF entity according to the first session modification request.

The first session modification indication is used to indicate establishment, deletion, update, or the like of a GBR bearer.

Step B2: The PCEF entity receives a first session modification response that is returned by the PCRF entity and that includes a new PCC rule, where the new PCC rule is set by the PCRF entity according to the first session modification indication. For details of a setting method, refer to Embodiment 4, which are not described herein again.

Step B3: The PCEF entity modifies a current GBR bearer according to the new PCC rule.

Different modifications are made according to different indications of the first session modification response. For example, the step "the PCEF entity modifies a current GBR bearer according to the new PCC rule" may be specifically as follows:

if the first session modification response indicates that a GBR bearer can be established, execute a GBR bearer establishment procedure according to the new PCC rule; or if the first session modification response indicates that a GBR bearer can be deleted, execute a GBR bearer deletion procedure according to the new PCC rule; or if the first session modification response indicates that a GBR bearer can be updated, when it is determined that a bearer service quality parameter does not need to be updated, execute a GBR bearer update procedure according to the new PCC rule; or if the first session modification response indicates that a GBR bearer can be established when it is determined that the allocation and retention priority ARP parameter included in the new PCC rule enables the user equipment to preempt an existing bearer resource and an MBR of a required bearer resource is less than an MBR of the preempted bearer resource, when it is determined that the ARP parameter included in the new PCC rule enables the user equipment to preempt an existing bearer resource and an MBR of a required bearer resource is less than an MBR of the preempted bearer resource, execute a GBR bearer establishment procedure, or otherwise, reject GBR bearer establishment; or if the first session modification response indicates that a GBR bearer can be updated when it is determined that a bearer service quality parameter does not need to be updated and an MBR is not to be increased, when it is determined that a bearer service quality parameter does not need to be updated and an MBR is not to be increased, execute a bearer update procedure according to the new PCC rule.

step B4: The PCEF entity sends a first session modification result notification to the PCRF entity, where the first session modification result notification carries a user identifier of the user equipment and GBR bearer information.

The user identifier of the user equipment may be an IMSI, an MSIN, or the like. A corresponding identifier such as a PMNO ID or an APN may be found through search according to the user identifier, to determine the participant mobile network operator to which the user equipment belongs.

The GBR bearer information may include a bearer quantity and type, for example, whether a bearer is a GBR bearer or a non-GBR bearer, and if the bearer is a GBR bearer, may include a specific value of a parameter such as a GBR and/or an MBR.

(3) In a case in which the PCRF entity initiates a session modification procedure:

Before the sending, by a PCEF entity, an adjustment request to a PCRF entity, the method for managing a resource in a shared network may further include steps as follows:

Step C1: The PCEF entity receives a second session modification indication that is from the PCRF entity and that carries a new PCC rule.

The new PCC rule is set by the PCRF entity according to a current network status.

The second session modification indication is used to indicate establishment, deletion, update, or the like of a GBR bearer.

Step C2: The PCEF entity updates a current bearer according to the new PCC rule.

Different modifications are made according to different indications of the second session modification indication. For example, the step "the PCEF entity modifies a current bearer according to the new PCC rule" may be specifically as follows:

if the second session modification indication indicates that a GBR bearer can be established, execute a GBR bearer establishment procedure according to the new PCC rule; or if the second session modification indication indicates that a GBR bearer can be deleted, execute a GBR bearer deletion procedure according to the new PCC rule; or if the second session modification indication indicates that a GBR bearer can be updated, when it is determined that a bearer service quality parameter does not need to be updated, execute a GBR bearer update procedure according to the new PCC rule; or if the second session modification indication indicates that a GBR bearer can be established when it is determined that the allocation and retention priority ARP parameter included in the new PCC rule enables the user equipment to preempt an existing bearer resource and an MBR of a required bearer resource is less than an MBR of the preempted bearer resource, when it is determined that the ARP parameter included in the new PCC rule enables the user equipment to preempt an existing bearer resource and an MBR of a required bearer resource is less than an MBR of the preempted bearer resource, execute a GBR bearer establishment procedure, or otherwise, reject GBR bearer establishment; or if the second session modification indication indicates that a GBR bearer can be updated when it is determined that a bearer service quality parameter does not need to be updated and an MBR is not to be increased, when it is determined that a bearer service quality parameter does not need to be updated and an MBR is not to be increased, execute a GBR bearer update procedure according to the new PCC rule.

Step C3: The PCEF entity sends a second session modification result notification to the PCRF entity.

The second session modification result notification carries a user identifier of the user equipment and GBR bearer information.

The user identifier of the user equipment may be an IMSI, an MSIN, or the like. A corresponding identifier such as a PMNO ID or an APN may be found through search according to the user identifier, to determine the participant mobile network operator to which the user equipment belongs.

The GBR bearer information may include a bearer quantity and type, for example, whether a bearer is a GBR bearer or a non-GBR bearer, and if the bearer is a GBR bearer, may include a specific value of a parameter such as a GBR and/or an MBR.

It can be seen from above that, in this embodiment, a PCEF entity may send an adjustment request to a PCRF entity, where the adjustment request indicates a participant mobile network operator to which user equipment belongs, and requests to adjust a GBR quota and/or an MBR quota of the participant mobile network operator in the PCEF entity, then receive an adjustment response that is from the PCRF entity according to the adjustment request, and then adjust, according to the adjustment response, the GBR quota and/or the MBR quota of the participant mobile network operator to which the user equipment belongs in the PCEF entity. According to the solution, it can be determined, according to specific statuses of the subscription GBR resource of the participant mobile network operator and the used GBR resource of the participant mobile network operator, whether a GBR quota and/or an MBR quota of the participant mobile network operator in a PCEF entity can be adjusted. Therefore, compared with the prior art in which the GBR quota and/or the MBR quota are fixed, management and control can be performed for a GBR resource more flexibly and precisely, and precision and a control effect of resource management are greatly improved, so that a resource in a shared network can be fully used.

The method according to Embodiments 4 and 5 is further described in detail in the following Embodiments 6, 7, and 8 by using examples.

Embodiment 6

In this embodiment, a scenario in which a PCEF is specifically integrated in a P-GW and the PCEF initiates a session termination procedure is used as an example for description.

Figure 6:
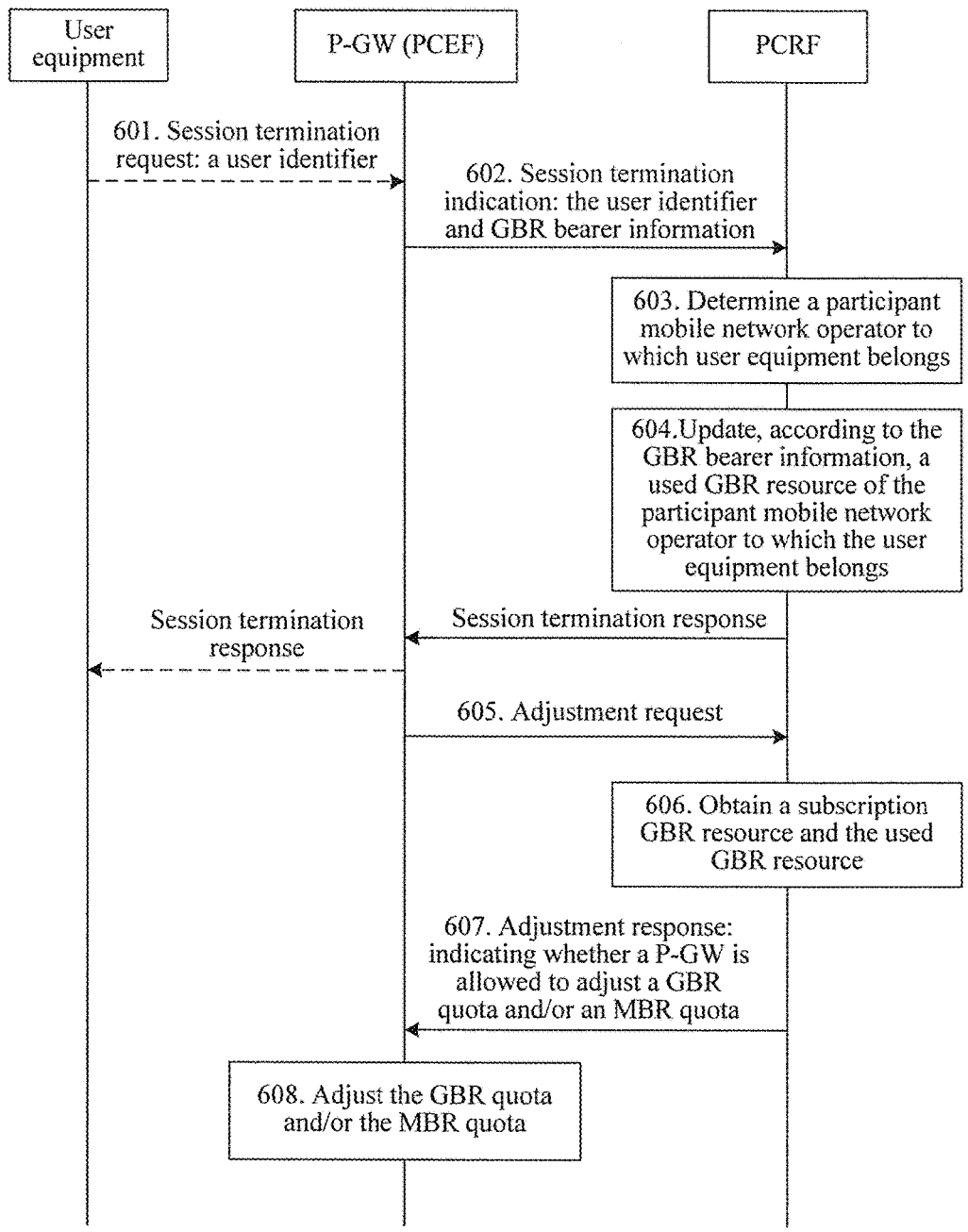
FIG. 6 is still another flowchart of a method for managing a resource in a shared network according to an embodiment of the present invention.

As shown in FIG. 6, a specific process of a method for managing a resource in a shared network may be as follows:

601: User equipment sends a session termination request to a P-GW, for example, an IP-CAN session termination request, where the session termination request includes a user identifier, corresponding to a session, of the user equipment.

The user identifier of the user equipment may be an IMSI, an MSIN, or the like.

602: After receiving the session termination request from the user equipment, the P-GW searches a corresponding PCRF entity according to the user identifier in the session termination request, and sends a session termination indication to the PCRF entity, where the session termination indication carries the user identifier of the user equipment and GBR bearer information.

The GBR bearer information may include a bearer quantity and type, for example, whether a bearer is a GBR bearer or a non-GBR bearer, and if the bearer is a GBR bearer, may include a specific value of a parameter such as a GBR and/or an MBR.

It should be noted that, the P-GW may directly obtain a user identifier, corresponding to a session, of user equipment, then search a corresponding PCRF entity according to the user identifier, and send a session termination indication to the PCRF entity, that is, step 601 is an optional step.

603: After receiving the session termination indication, the PCRF entity determines, according to the user identifier of the user equipment, a participant mobile network operator to which the user equipment belongs.

For example, a corresponding PMNO ID may be specifically found through search according to the user identifier of the user equipment, and then the participant mobile network operator to which the user equipment belongs is determined according to the found PMNO ID.

604: The PCRF entity updates, according to the GBR bearer information, a used GBR resource of the participant mobile network operator to which the user equipment belongs.

In addition, after updating, according to the GBR bearer information, the used GBR resource of the participant mobile network operator to which the user equipment belongs, the PCRF entity may further send a session termination response to the P-GW (that is, a PCEF entity), and after receiving the session termination response, the P-GW may further send the session termination response to the user equipment, which is an optional step, and details are not described herein.

605: When determining that a sum of MBRs currently used by all GBR bearers of the PCEF entity has not exceeded a first preset threshold, and a sum of MBRs currently used by all GBR bearers of the participant mobile network operator (that is, the participant mobile network operator to which a user belongs) in the P-GW has reached the MBR quota, the P-GW sends an adjustment request to the PCEF entity.

The adjustment request indicates the participant mobile network operator to which the user equipment belongs, and requests to adjust a GBR quota and/or the MBR quota of the participant mobile network operator in the P-GW.

It should be noted that, if the P-GW determines that the sum of the MBRs currently used by all the GBR bearers of the P-GW has exceeded the first preset threshold, the P-GW may adjust, to the GBR quota, a sum of MBRs of all the GBR bearers of the participant mobile network operator to which the user equipment belongs, compare an actual used bit rate of each GBR bearer with a GBR corresponding to the GBR bearer (that is, a GBR of the GBR bearer), adjust, to a GBR (that is, a GBR of a GBR bearer), an actual used bit rate of the GBR bearer whose current actual used bit rate is greater than the GBR (that is, the GBR of the GBR bearer), and if the current actual used bit rate of each GBR bearer has not exceeded the GBR corresponding to the GBR bearer (that is, the GBR of the GBR bearer), but a sum of the current actual used bit rates of all the GBR bearers has exceeded a second preset threshold, when a new GBR bearer needs to be established, preempt a bit rate bearer resource for the new GBR bearer according to an ARP parameter.

The first preset threshold and the second preset threshold may be set according to an actual application requirement, and details are not described herein.

606: After receiving the adjustment request, the PCRF entity obtains, according to the adjustment request, a subscription GBR resource allocated by a primary operator to the participant mobile network operator and the used GBR resource of the participant mobile network operator.

The used GBR resource is a sum of GBR resources currently used by all the GBR bearers of the participant mobile network operator, and the subscription GBR is a sum of GBR resources that can be used by all the GBR bearers of the participant mobile network operator at any moment.

It should be noted that, the PCRF entity maintains statuses of a subscription GBR resource (that is, a subscription GBR throughput) of each participant mobile network operator and a used GBR resource (a used GBR throughput) of each participant mobile network operator. That is, in addition to the subscription GBR resource determined through negotiation between the primary operator and each participant mobile network operator, the PCRF further needs to collect usage of a GBR resource in each P-GW, to determine the used GBR resource of the participant mobile network operator, where the usage of the GBR resource may be actively obtained by the PCRF entity, or may be obtained through statistics collection according to session establishment and modification and other statuses of the P-GW. For example, when a GBR bearer change occurs, for example, a GBR bearer is established, deleted, or updated, a used GBR resource of a participant mobile network operator to which the GBR bearer belongs may change. Therefore, in this case, a status, maintained in the PCRF, of the used GBR resource of the participant mobile network operator may be updated. For example, steps 601 to 604 belong to a scenario in which session termination causes a GBR resource change.

607: The PCRF sends an adjustment response to the P-GW according to the obtained subscription GBR resource and used GBR resource, where the adjustment response indicates whether the P-GW is allowed to adjust the GBR quota and/or the MBR quota. For example, details may be as follows:

when the used GBR resource is less than the subscription GBR resource, send, to the P-GW, an adjustment response indicating that the P-GW is allowed to adjust the GBR quota and/or the MBR quota; or when the used GBR resource is equal to the subscription GBR resource, send, to the P-GW, an adjustment response indicating that the P-GW is not allowed to adjust the GBR quota and/or the MBR quota.

608: The P-GW adjusts, according to the adjustment response, the GBR quota and/or the MBR quota of the participant mobile network operator to which the user equipment belongs in the P-GW. For example, details may be as follows:

if the adjustment response indicates adjustment by the P-GW is allowed, the P-GW may increase the GBR quota and/or the MBR quota; or if the adjustment response indicates that adjustment by the P-GW is not allowed, the P-GW adjusts, to a GBR (that is, a GBR of a GBR bearer), an actual used bit rate of the GBR bearer whose current actual used bit rate is greater than the GBR (that is, the GBR of the GBR bearer); or if the adjustment response indicates that adjustment by the P-GW is not allowed, and the P-GW determines that a current actual used bit rate of each GBR bearer in the P-GW has not exceeded a GBR corresponding to the GBR bearer (that is, a GBR of the GBR bearer), but a sum of the current actual used bit rates of all the GBR bearers has exceeded a second preset threshold, when a new bit rate bearer needs to be established, the P-GW preempts a bit rate bearer resource for the new bit rate bearer according to an ARP parameter.

The second preset threshold may be set according to an actual application requirement, and details are not described herein.

In addition, after adjusting the GBR quota and/or the MBR quota, the P-GW may perform management and control for a GBR bearer of the participant mobile network operator according to the GBR quota and/or the MBR quota, for example, according to the adjusted GBR quota and/or MBR quota, determine whether establishment of a new GBR bearer is allowed, and how to allocate a GBR bearer resource to the new GBR bearer. Details are not described herein.

It can be seen from above that, in this embodiment, when a P-GW initiates a session termination indication, a PCRF entity may update, according to a GBR resource change caused by the operation, a used GBR resource of a corresponding participant mobile network operator, so that when the P-GW needs to adjust a GBR quota and/or an MBR quota of a participant mobile network operator in the P-GW, the PCRF entity may return an adjustment response to the P-GW according to an adjustment request initiated by the P-GW and a subscription GBR resource and a used GBR resource of the participant mobile network operator, to instruct the P-GW to adjust the GBR quota and/or the MBR quota of the participant mobile network operator to which the user equipment belongs in the P-GW. According to the solution, it can be determined, according to specific statuses of the subscription GBR resource of the participant mobile network operator and the used GBR resource of the participant mobile network operator, whether a GBR quota and/or an MBR quota of the participant mobile network operator in a PCEF entity can be adjusted. Therefore, compared with the prior art in which the GBR quota and/or the MBR quota are fixed, management and control can be performed for a GBR resource more flexibly and precisely, and precision and a control effect of resource management are greatly improved, so that a resource in a shared network can be fully used.

Embodiment 7

In this embodiment, a scenario in which a PCEF is specifically integrated in a P-GW and the PCEF initiates a session modification procedure is used as an example for description.

Figure 7:
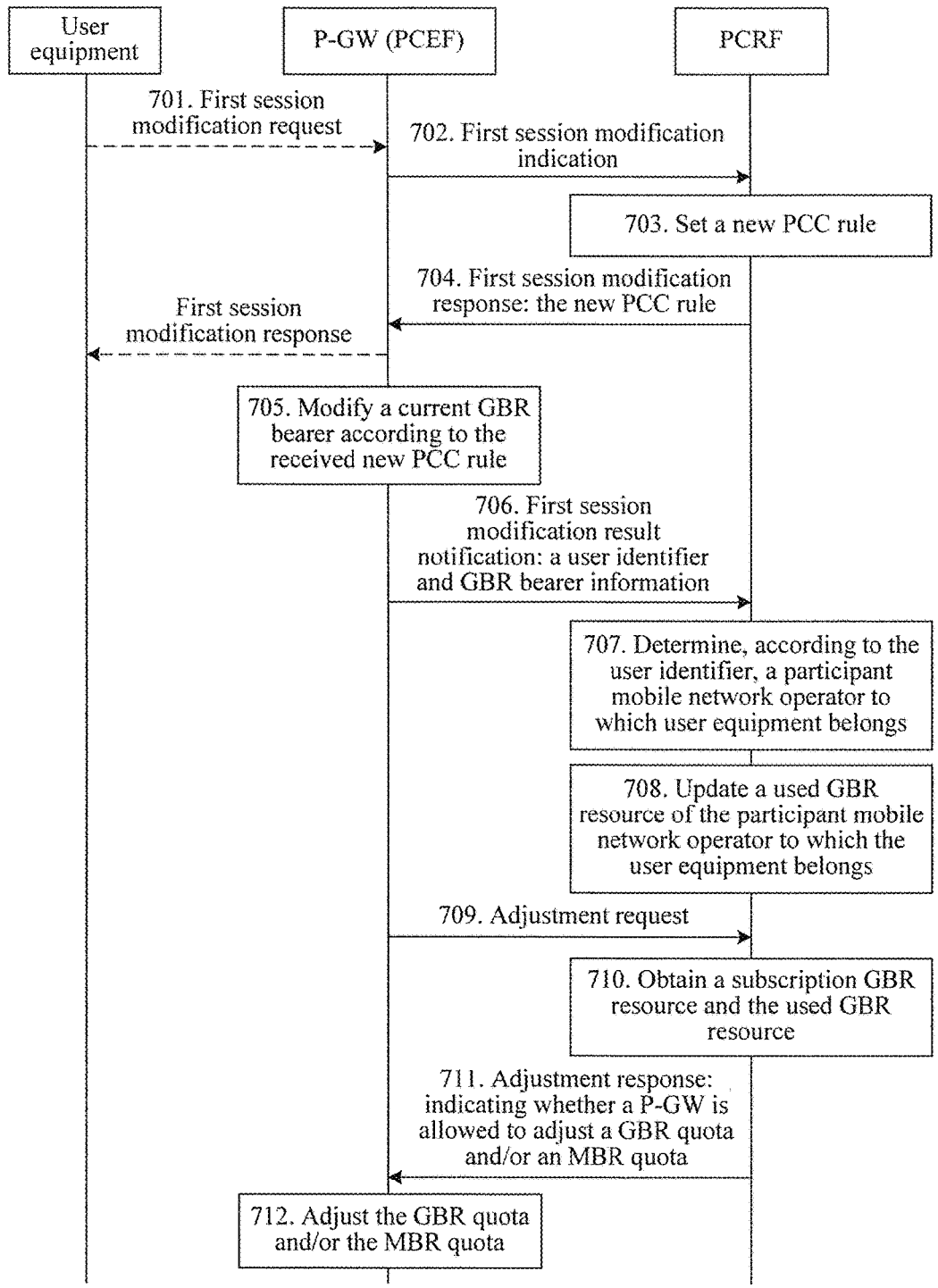
FIG. 7 is still another flowchart of a method for managing a resource in a shared network according to an embodiment of the present invention.

As shown in FIG. 7, a specific process of a method for managing a resource in a shared network may be as follows:

701: User equipment sends a first session modification request to a P-GW, for example, an IP-CAN session modification request, where the first session modification request includes a user identifier, corresponding to a session, of the user equipment.

The user identifier of the user equipment may be an IMSI, an MSIN, or the like.

702: After receiving the first session modification request from the user equipment, the P-GW searches a corresponding PCRF entity according to the user identifier in the first session modification request, and sends a first session modification indication to the PCRF entity.

It should be noted that, the P-GW may directly obtain a user identifier, corresponding to a session, of user equipment, then search a corresponding PCRF entity according to the user identifier, and send a session modification indication to the PCRF entity, that is, step 701 is an optional step.

703: After receiving the first session modification indication, the PCRF entity sets a new PCC rule according to the first session modification indication.

704: The PCRF entity returns a first session modification response to the PCEF entity, where the first session modification response carries the new PCC rule.

705: After receiving the first session modification response, the P-GW modifies a current GBR bearer according to the received new PCC rule. For example, details may be as follows:

if the first session modification response indicates that a GBR bearer can be established, the PCEF entity executes a GBR bearer establishment procedure according to the new PCC rule; or if the first session modification response indicates that a GBR bearer can be deleted, the PCEF entity executes a GBR bearer deletion procedure according to the new PCC rule; or if the first session modification response indicates that a GBR bearer can be updated, when it is determined that a bearer service quality parameter does not need to be updated, the PCEF entity executes a GBR bearer update procedure according to the new PCC rule; or if the first session modification response indicates that a GBR bearer can be established when it is determined that the allocation and retention priority ARP parameter included in the new PCC rule enables the user equipment to preempt an existing bearer resource and an MBR of a required bearer resource is less than an MBR of the preempted bearer resource, when it is determined that the ARP parameter included in the new PCC rule enables the user equipment to preempt an existing bearer resource and an MBR of a required bearer resource is less than an MBR of the preempted bearer resource, the PCEF entity executes a GBR bearer establishment procedure, or otherwise, rejects GBR bearer establishment; or if the first session modification response indicates that a GBR bearer can be updated when it is determined that a bearer service quality parameter does not need to be updated and an MBR is not to be increased, when it is determined that a bearer service quality parameter does not need to be updated and an MBR is not to be increased, the PCEF entity executes a bearer update procedure according to the new PCC rule.

In addition, it should be noted that, if session modification is initiated by the user equipment, in this case, the P-GW may farther return the first session modification response to the user equipment. Details are not described herein.

706: The P-GW sends a first session modification result notification to the PCRF entity, where the first session modification result notification carries a user identifier of the user equipment and GBR bearer information.

The GBR bearer information may include a bearer quantity and type, for example, whether a bearer is a GBR bearer or a non-GBR bearer, and if the bearer is a GBR bearer, may include a specific value of a parameter such as a GBR and/or an MBR.

707: After receiving the first session modification result notification, the PCRF entity determines, according to the user identifier of the user equipment, a participant mobile network operator to which the user equipment belongs.

For example, the PCRF entity may specifically find a corresponding PMNO ID through search according to the user identifier of the user equipment, and then determine, according to the found PMNO ID, the participant mobile network operator to which the user equipment belongs.

708: The PCRF entity updates, according to the GBR bearer information, a used GBR resource of the participant mobile network operator to which the user equipment belongs.

In addition, after updating, according to the GBR bearer information, the used GBR resource of the participant mobile network operator to which the user equipment belongs, the PCRF entity may further send a session modification response to the P-GW (that is, the PCEF entity), and after receiving the session modification response, the P-GW may further send the session modification response to the user equipment, which is an optional step, and details are not described herein.

709: When determining that a sum of MBRs currently used by all GBR bearers of the PCEF entity has not exceeded a first preset threshold, and a sum of MBRs currently used by all GBR bearers of the participant mobile network operator (that is, the participant mobile network operator to which a user belongs) in the P-GW has reached the MBR quota, the P-GW sends an adjustment request to the PCRF entity.

The adjustment request indicates the participant mobile network operator to which the user equipment belongs, and requests to adjust a GBR quota and/or the MBR quota of the participant mobile network operator in the P-GW.

It should be noted that, if the P-GW determines that the sum of the MBRs currently used by all the GBR bearers of the P-GW has exceeded the first preset threshold, the P-GW may adjust, to the GBR quota, a sum of MBRs of all the GBR bearers of the participant mobile network operator to which the user equipment belongs, compare an actual used bit rate of each GBR bearer with a GBR corresponding to the GBR bearer (that is, a GBR of the GBR bearer), adjust, to a GBR (that is, a GBR of a GBR bearer), an actual used bit rate of the GBR bearer whose current actual used bit rate is greater than the GBR (that is, the GBR of the GBR bearer), and if the current actual used bit rate of each GBR bearer has not exceeded the GBR corresponding to the GBR bearer (that is, the GBR of the GBR bearer), but a sum of the current actual used bit rates of all the GBR bearers has exceeded a second preset threshold, when a new GBR bearer needs to be established, preempt a bit rate bearer resource for the new GBR bearer according to an ARP parameter.

The first preset threshold and the second preset threshold may be set according to an actual application requirement, and details are not described herein.

710: After receiving the adjustment request, the PCRF entity obtains, according to the adjustment request, a subscription GBR resource allocated by a primary operator to the participant mobile network operator and the used GBR resource of the participant mobile network operator.

The used GBR resource is a sum of GBR resources currently used by all the GBR bearers of the participant mobile network operator, and the subscription GBR is a sum of GBR resources that can be used by all the GBR bearers of the participant mobile network operator at any moment.

It should be noted that, the PCRF entity maintains statuses of a subscription GBR resource (that is, a subscription GBR throughput) of each participant mobile network operator and a used GBR resource (a used GBR throughput) of each participant mobile network operator. That is, in addition to the subscription GBR resource determined through negotiation between the primary operator and each participant mobile network operator, the PCRF further needs to collect usage of a GBR resource in each P-GW, to determine the used GBR resource of the participant mobile network operator, where the usage of the GBR resource may be actively obtained by the PCRF entity, or may be obtained through statistics collection according to session establishment and modification and other statuses of the P-GW. For example, when a GBR bearer change occurs, for example, a GBR bearer is established, deleted, or updated, a used GBR resource of a participant mobile network operator to which the GBR bearer belongs may change. Therefore, in this case, a status, maintained in the PCRF, of the used GBR resource of the participant mobile network operator may be updated. For example, steps 701 to 708 belong to a scenario in which session modification causes a GBR resource change.

711: The PCRF sends an adjustment response to the P-GW according to the obtained subscription GBR resource and used GBR resource, where the adjustment response indicates whether the P-GW is allowed to adjust the GBR quota and/or the MBR quota. For example, details may be as follows:

when the used GBR resource is less than the subscription GBR resource, send, to the P-GW, an adjustment response indicating that the P-GW is allowed to adjust the GBR quota and/or the MBR quota; or when the used GBR resource is equal to the subscription GBR resource, send, to the P-GW, an adjustment response indicating that the P-GW is not allowed to adjust the GBR quota and/or the MBR quota.

712: The P-GW adjusts, according to the adjustment response, the GBR quota and/or the MBR quota of the participant mobile network operator to which the user equipment belongs in the P-GW. For example, details may be as follows:

if the adjustment response indicates adjustment by the P-GW is allowed, the P-GW may increase the GBR quota and/or the MBR quota; or if the adjustment response indicates that adjustment by the P-GW is not allowed, the P-GW adjusts, to a GBR (that is, a GBR of a GBR bearer), an actual used bit rate of the GBR bearer whose current actual used bit rate is greater than the GBR (that is, the GBR of the GBR bearer); or if the adjustment response indicates that adjustment by the P-GW is not allowed, and the P-GW determines that a current actual used bit rate of each GBR bearer in the P-GW has not exceeded a GBR corresponding to the GBR bearer (that is, a GBR of the GBR bearer), but a sum of the current actual used bit rates of all the GBR bearers has exceeded a second preset threshold, when a new bit rate bearer needs to be established, the P-GW preempts a bit rate bearer resource for the new bit rate bearer according to an ARP parameter.

The second preset threshold may be set according to an actual application requirement, and details are not described herein.

In addition, after adjusting the GBR quota and/or the MBR quota, the P-GW may perform management and control for a GBR bearer of the participant mobile network operator according to the GBR quota and/or the MBR quota, for example, according to the adjusted GBR quota and/or MBR quota, determine whether establishment of a new GBR bearer is allowed, and how to allocate a GBR bearer resource to the new GBR bearer. Details are not described herein.

It can be seen from above that, in this embodiment, when a P-GW initiates a session modification indication, a PCRF entity may update, according to a GBR resource change caused by the operation, a used GBR resource of a corresponding participant mobile network operator, so that when the P-GW needs to adjust a GBR quota and/or an MBR quota of a participant mobile network operator in the P-GW, the PCRF entity may return an adjustment response to the P-GW according to an adjustment request initiated by the P-GW and a subscription GBR resource and a used GBR resource of the participant mobile network operator, to instruct the P-GW to adjust the GBR quota and/or the MBR quota of the participant mobile network operator to which the user equipment belongs in the P-GW. According to the solution, it can be determined, according to specific statuses of the subscription GBR resource of the participant mobile network operator and the used GBR resource of the participant mobile network operator, whether a GBR quota and/or an MBR quota of the participant mobile network operator in a PCEF entity can be adjusted. Therefore, compared with the prior art in which the GBR quota and/or the MBR quota are fixed, management and control can be performed for a GBR resource more flexibly and precisely, and precision and a control effect of resource management are greatly improved, so that a resource in a shared network can be fully used.

Embodiment 8

In this embodiment, a scenario in which a PCEF is specifically integrated in a P-GW and the PCEF initiates a session modification procedure is used as an example for description.

Figure 8:
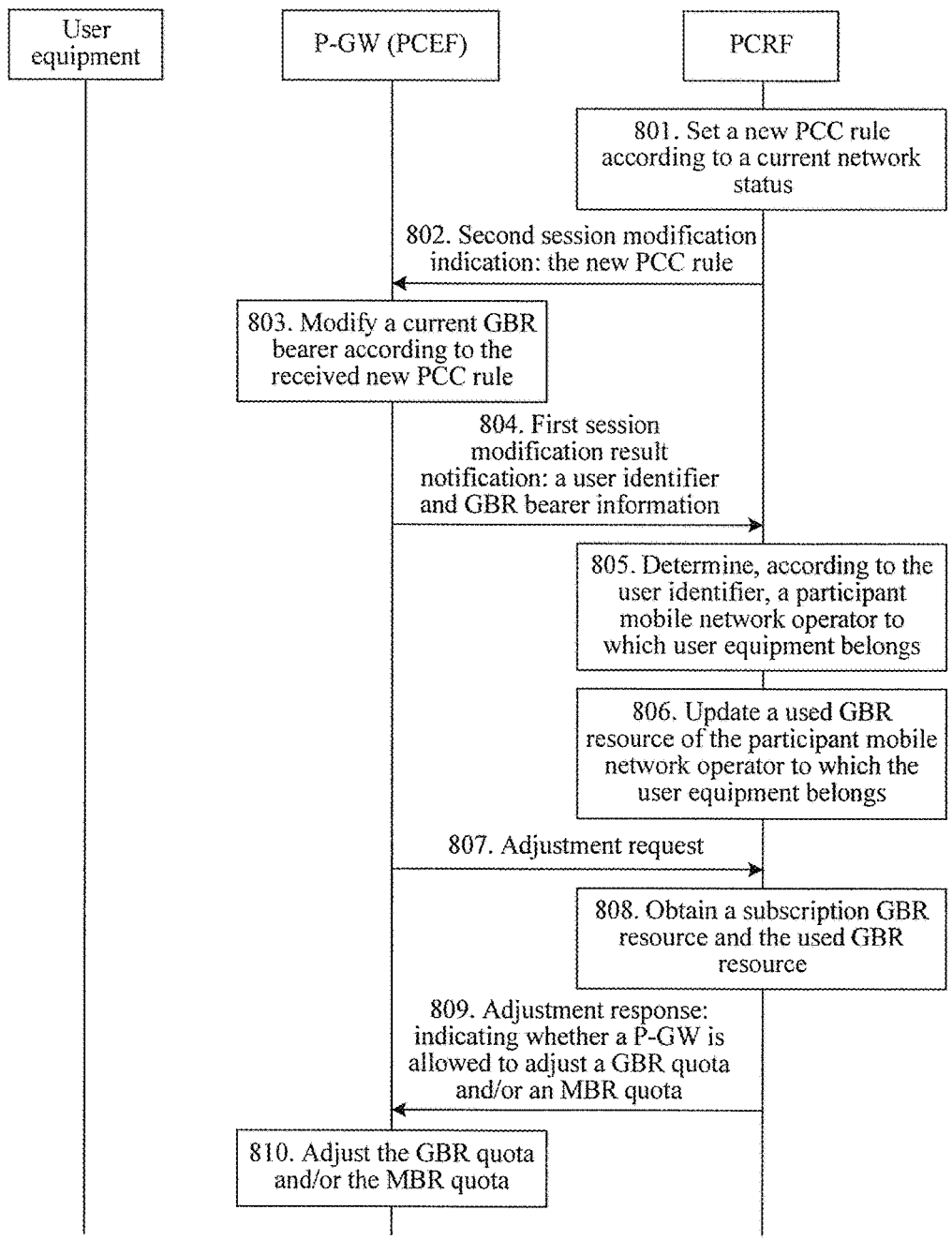
FIG. 8 is still another flowchart of a method for managing a resource in a shared network according to an embodiment of the present invention.

As shown in FIG. 8, a specific process of a method for managing a resource in a shared network may be as follows:

801: A PCRF entity sets a new PCC rule according to a current network status.

802: The PCRF entity sends a second session modification indication to a P-GW, where the second session modification indication carries the new PCC rule.

803: After receiving the second session modification indication, the P-GW modifies a current GBR bearer according to the received new PCC rule. For example, details may be as follows:

if the second session modification indication indicates that a GBR bearer can be established, the PCEF entity executes a GBR bearer establishment procedure according to the new PCC rule; or if the second session modification indication indicates that a GBR bearer can be deleted, the PCEF entity executes a GBR bearer deletion procedure according to the new PCC rule; or if the second session modification indication indicates that a GBR bearer can be updated, when it is determined that a bearer service quality parameter does not need to be updated, the PCEF entity executes a GBR bearer update procedure according to the new PCC rule; or if the second session modification indication indicates that a GBR bearer can be established when it is determined that the allocation and retention priority ARP parameter included in the new PCC rule enables the user equipment to preempt an existing bearer resource and an MBR of a required bearer resource is less than an MBR of the preempted bearer resource, when it is determined that the ARP parameter included in the new PCC rule enables the user equipment to preempt an existing bearer resource and an MBR of a required bearer resource is less than an MBR of the preempted bearer resource, the PCEF entity executes a GBR bearer establishment procedure, or otherwise, rejects GBR bearer establishment; or if the second session modification indication indicates that a GBR bearer can be updated when it is determined that a bearer service quality parameter does not need to be updated and an MBR is not to be increased, when it is determined that a bearer service quality parameter does not need to be updated and an MBR is not to be increased, the PCEF entity executes a GBR bearer update procedure according to the new PCC rule.

804: The P-GW sends a second session modification result notification to the PCRF entity, where the second session modification result notification carries a user identifier of user equipment and GBR bearer information.

The user identifier of the user equipment may be an IMSI, an MSIN, or the like. A corresponding identifier such as a PMNO ID or an APN may be found through search according to the user identifier, to determine a participant mobile network operator to which the user equipment belongs.

The GBR bearer information may include a bearer quantity and type, for example, whether a bearer is a GBR bearer or a non-GBR bearer, and if the bearer is a GBR bearer, may include a specific value of a parameter such as a GBR and/or an MBR.

805: After receiving the second session modification result notification, the PCRF entity determines, according to the user identifier of the user equipment, a participant mobile network operator to which the user equipment belongs.

For example, the PCRF entity may specifically find a corresponding PMNO ID through search according to the user identifier of the user equipment, and then determine, according to the found PMNO ID, the participant mobile network operator to which the user equipment belongs.

806: The PCRF entity updates, according to the GBR bearer information, a used GBR resource of the participant mobile network operator to which the user equipment belongs.

In addition, after updating, according to the GBR bearer information, the used GBR resource of the participant mobile network operator to which the user equipment belongs, the PCRF entity may further send a session modification response to the P-GW (that is, the PCEF entity), and after receiving the session modification response, the P-GW may further send the session modification response to the user equipment, which is an optional step, and details are not described herein.

807: When determining that a sum of MBRs currently used by all GBR bearers of the PCEF entity has not exceeded a first preset threshold, and a sum of MBRs currently used by all GBR bearers of the participant mobile network operator (that is, the participant mobile network operator to which a user belongs) in the P-GW has reached the MBR quota, the P-GW sends an adjustment request to the PCEF entity.

The adjustment request indicates the participant mobile network operator to which the user equipment belongs, and requests to adjust a GBR quota and/or the MBR quota of the participant mobile network operator in the P-GW.

It should be noted that, if the P-GW determines that the sum of the MBRs currently used by all the GBR bearers of the P-GW has exceeded the first preset threshold, the P-GW may adjust, to the GBR quota, a sum of MBRs of all the GBR bearers of the participant mobile network operator to which the user equipment belongs, compare an actual used bit rate of each GBR bearer with a GBR corresponding to the GBR bearer (that is, a GBR of the GBR bearer), adjust, to a GBR (that is, a GBR of a GBR bearer), an actual used bit rate of the GBR bearer whose current actual used bit rate is greater than the GBR (that is, the GBR of the GBR bearer), and if the current actual used bit rate of each GBR bearer has not exceeded the GBR corresponding to the GBR bearer (that is, the GBR of the GBR bearer), but a sum of the current actual used bit rates of all the GBR bearers has exceeded a second preset threshold, when a new GBR bearer needs to be established, preempt a bit rate bearer resource for the new GBR bearer according to an ARP parameter.

The first preset threshold and the second preset threshold may be set according to an actual application requirement, and details are not described herein.

808: After receiving the adjustment request, the PCRF entity obtains, according to the adjustment request, a subscription GBR resource allocated by a primary operator to the participant mobile network operator and the used GBR resource of the participant mobile network operator.

The used GBR resource is a sum of GBR resources currently used by all the GBR bearers of the participant mobile network operator, and the subscription GBR is a sum of GBR resources that can be used by all the GBR bearers of the participant mobile network operator at any moment.

It should be noted that, the PCRF entity maintains statuses of a subscription GBR resource (that is, a subscription GBR throughput) of each participant mobile network operator and a used GBR resource (a used GBR throughput) of each participant mobile network operator. That is, in addition to the subscription GBR resource determined through negotiation between the primary operator and each participant mobile network operator, the PCRF further needs to collect usage of a GBR resource in each P-GW, to determine the used GBR resource of the participant mobile network operator, where the usage of the GBR resource may be actively obtained by the PCRF entity, or may be obtained through statistics collection according to session establishment and modification and other statuses of the P-GW. For example, when a GBR bearer change occurs, for example, a GBR bearer is established, deleted, or updated, a used GBR resource of a participant mobile network operator to which the GBR bearer belongs may change. Therefore, in this case, a status, maintained in the PCRF, of the used GBR resource of the participant mobile network operator may be updated. For example, steps 801 to 806 belong to a scenario in which session modification causes a GBR resource change.

809: The PCRF sends an adjustment response to the P-GW according to the obtained subscription GBR resource and used GBR resource, where the adjustment response indicates whether the P-GW is allowed to adjust the GBR quota and/or the MBR quota. For example, details may be as follows:

when the used GBR resource is less than the subscription GBR resource, send, to the P-GW, an adjustment response indicating that the P-GW is allowed to adjust the GBR quota and/or the MBR quota; or when the used GBR resource is equal to the subscription GBR resource, send, to the P-GW, an adjustment response indicating that the P-GW is not allowed to adjust the GBR quota and/or the MBR quota.

810: The P-GW adjusts, according to the adjustment response, the GBR quota and/or the MBR quota of the participant mobile network operator to which the user equipment belongs in the P-GW. For example, details may be as follows:

if the adjustment response indicates adjustment by the P-GW is allowed, the P-GW may increase the GBR quota and/or the MBR quota; or if the adjustment response indicates that adjustment by the P-GW is not allowed, the P-GW adjusts, to a GBR (that is, a GBR of a GBR bearer), an actual used bit rate of the GBR bearer whose current actual used bit rate is greater than the GBR (that is, the GBR of the GBR bearer); or if the adjustment response indicates that adjustment by the P-GW is not allowed, and the P-GW determines that a current actual used bit rate of each GBR bearer in the P-GW has not exceeded a GBR corresponding to the GBR bearer (that is, a GBR of the GBR bearer), but a sum of the current actual used bit rates of all the GBR bearers has exceeded a second preset threshold, when a new bit rate bearer needs to be established, the P-GW preempts a bit rate bearer resource for the new bit rate bearer according to an ARP parameter.

The second preset threshold may be set according to an actual application requirement, and details are not described herein.

In addition, after adjusting the GBR quota and/or the MBR quota, the P-GW may perform management and control for a GBR bearer of the participant mobile network operator according to the GBR quota and/or the MBR quota, for example, according to the adjusted GBR quota and/or MBR quota, determine whether establishment of a new GBR bearer is allowed, and how to allocate a GBR bearer resource to the new GBR bearer. Details are not described herein.

It can be seen from above that, in this embodiment, when initiating a session modification indication, a PCRF entity may update, according to a GBR resource change caused by the operation, a used GBR resource of a corresponding participant mobile network operator, so that when a P-GW needs to adjust a GBR quota and/or an MBR quota of a participant mobile network operator in the P-GW, the PCRF entity may return an adjustment response to the P-GW according to an adjustment request initiated by the P-GW and a subscription GBR resource and a used GBR resource of the participant mobile network operator, to instruct the P-GW to adjust the GBR quota and/or the MBR quota of the participant mobile network operator to which the user equipment belongs in the P-GW. According to the solution, it can be determined, according to specific statuses of the subscription GBR resource of the participant mobile network operator and the used GBR resource of the participant mobile network operator, whether a GBR quota and/or an MBR quota of the participant mobile network operator in a PCEF entity can be adjusted. Therefore, compared with the prior art in which the GBR quota and/or the MBR quota are fixed, management and control can be performed for a GBR resource more flexibly and precisely, and precision and a control effect of resource management are greatly improved, so that a resource in a shared network can be fully used.

Embodiment 9

Figure 9:
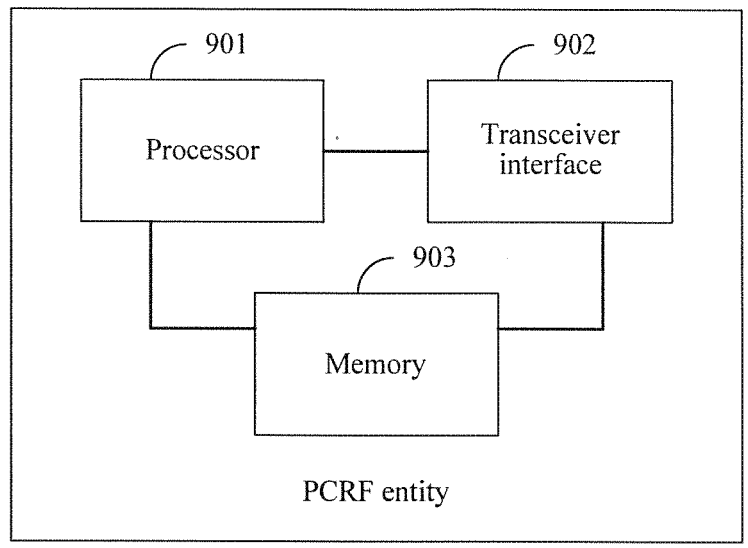
FIG. 9 is a schematic diagram of a PCRF entity according to an embodiment of the present invention.

In addition, this embodiment of the present invention further provides a policy and charging rule function entity, that is, a PCRF entity. As shown in FIG. 9, the PCRF entity may include a processor 901, a transceiver interface 902, and a memory 903 configured to store data.

The transceiver interface 902 is configured to: receive an adjustment request from a PCEF entity, and provide the adjustment request to the processor 901, where the adjustment request indicates a participant mobile network operator to which user equipment belongs, and requests to adjust a GBR quota and/or an MBR quota of the participant mobile network operator in the PCEF entity; and send, under the control of the processor 901, an adjustment response to the PCEF entity according to the subscription GBR resource and the used GBR resource, where the adjustment response indicates whether the PCEF entity is allowed to adjust the GBR quota and/or the MBR quota.

The processor 901 is configured to: obtain the subscription GBR resource allocated by a primary operator to the participant mobile network operator and the used GBR resource of the participant mobile network operator; and generate the adjustment response according to the subscription GBR resource and the used GBR resource, and control the transceiver interface 902 to send the adjustment response to the PCEF entity.

The MBR quota is a sum of MBR resources that are in the PCEF entity and that can be used by all GBR resource bearers of the participant mobile network operator; and the GBR quota is a sum of GBR resources that are in the PCEF entity and that can be used by all the GBR resource bearers of the participant mobile network operator. The used GBR resource is a sum of GBR resources currently used by all GBR bearers of the participant mobile network operator; and the subscription GBR is a sum of GBR resources that can be used by all the GBR bearers of the participant mobile network operator at any moment.

For example, the processor 901 may be specifically configured to: when the used GBR resource is less than the subscription GBR resource, generate an adjustment response indicating that the PCEF entity is allowed to adjust the GBR quota and/or the MBR quota; or when the used GBR resource is equal to the subscription GBR resource, generate an adjustment response indicating that the PCEF entity is not allowed to adjust the GBR quota and/or the MBR quota.

In addition, the PCRF entity further needs to collect usage of a GBR resource in each PCEF entity, to determine the used GBR resource of the participant mobile network operator, where the usage of the GBR resource may be actively obtained by the PCRF entity, or may be obtained through statistics collection according to session establishment and modification and other statuses of the PCEF entity. For example, details may be as follows:

(1) In a case in which the PCEF entity initiates a session termination procedure:

The transceiver interface 902 may be further configured to receive a session termination indication from the PCEF entity, where the session termination indication carries a user identifier of the user equipment and GBR bearer information.

The user identifier of the user equipment may be an IMSI, an MSIN, or the like. A corresponding identifier such as a PMNO ID or an APN may be found through search according to the user identifier, to determine the participant mobile network operator to which the user equipment belongs.

The GBR bearer information may include a bearer quantity and type, for example, whether a bearer is a GBR bearer or a non-GBR bearer, and if the bearer is a GBR bearer, may include a specific value of a parameter such as a GBR and/or an MBR.

The processor 901 may be further configured to determine, according to the user identifier of the user equipment, the participant mobile network operator to which the user equipment belongs; and update, according to the GBR bearer infatuation, the used GBR resource of the participant mobile network operator to which the user equipment belongs.

(2) In a case in which the PCEF entity initiates a session modification procedure:

The transceiver interface 902 may be further configured to: receive a first session modification indication from the PCEF entity, return, under the control of the processor 901, a first session modification response to the PCEF entity, and then receive a first session modification result notification from the PCEF entity, where the first session modification result notification carries a user identifier of the user equipment and GBR bearer information.

The processor 901 may be further configured to: set a new PCC rule according to the first session modification indication received by the transceiver interface 902, generate a first session modification response carrying the new PCC rule, and control the transceiver interface 902 to send the first session modification response to the PCEF entity, so that the PCEF entity modifies a current GBR bearer according to the new PCC rule; and after the transceiver interface 902 receives a first session modification result notification, determine, according to a user identifier of the user equipment carried in the first session modification result notification, the participant mobile network operator to which the user equipment belongs, and update, according to GBR bearer information carried in the first session modification result notification, the used GBR resource of the participant mobile network operator to which the user equipment belongs.

The user identifier of the user equipment may be an IMSI, an MSIN, or the like. A corresponding identifier such as a PMNO ID or an APN may be found through search according to the user identifier, to determine the participant mobile network operator to which the user equipment belongs.

The GBR bearer information may include a bearer quantity and type, for example, whether a bearer is a GBR bearer or a non-GBR bearer, and if the bearer is a GBR bearer, may include a specific value of a parameter such as a GBR and/or an MBR.

(3) In a case in which the PCRF entity initiates a session modification procedure:

The processor 901 may be further configured to: set a new PCC rule according to a current network status, generate a second session modification indication carrying the new PCC rule, and control the transceiver interface 902 to send the second session modification indication to the PCEF entity, so that the PCEF entity modifies a current GBR bearer according to the new PCC rule; and after the transceiver interface 902 receives a second session modification result notification, determine, according to a user identifier of the user equipment carried in the second session modification result notification, the participant mobile network operator to which the user equipment belongs, and update, according to GBR bearer information carried in the second session modification result notification, the used GBR resource of the participant mobile network operator to which the user equipment belongs.

The transceiver interface 902 may be further configured to send, under the control of the processor 901, the second session modification indication to the PCEF entity, and receive the second session modification result notification from the PCEF entity, where the second session modification result notification carries the user identifier of the user equipment and the GBR bearer information.

The user identifier of the user equipment may be an IMSI, an MSIN, or the like. A corresponding identifier such as a PMNO ID or an APN may be found through search according to the user identifier, to determine the participant mobile network operator to which the user equipment belongs.

The GBR bearer information may include a bearer quantity and type, for example, whether a bearer is a GBR bearer or a non-GBR bearer, and if the bearer is a GBR bearer, may include a specific value of a parameter such as a GBR and/or an MBR.

For specific implementation of the components above, refer to the previous embodiments. Details are not described herein again.

It can be seen from above that, the PCRF entity in this embodiment may receive an adjustment request from a PCEF entity, where the adjustment request indicates a participant mobile network operator to which user equipment belongs, and requests to adjust a GBR quota and/or an MBR quota of the participant mobile network operator in the PCEF entity, then obtain, according to the adjustment request, a subscription GBR resource allocated by a primary operator to the participant mobile network operator and a used GBR resource of the participant mobile network operator, and then send an adjustment response to the PCEF entity according to the subscription GBR resource and the used GBR resource, to indicate whether the PCEF entity is allowed to adjust the GBR quota and/or the MBR quota. According to the solution, it can be determined, according to specific statuses of the subscription GBR resource of the participant mobile network operator and the used GBR resource of the participant mobile network operator, whether a GBR quota and/or an MBR quota of the participant mobile network operator in a PCEF entity can be adjusted. Therefore, compared with the prior art in which the GBR quota and/or the MBR quota are fixed, management and control can be performed for a GBR resource more flexibly and precisely, and precision and a control effect of resource management are greatly improved, so that a resource in a shared network can be fully used.

Embodiment 10

Figure 10:
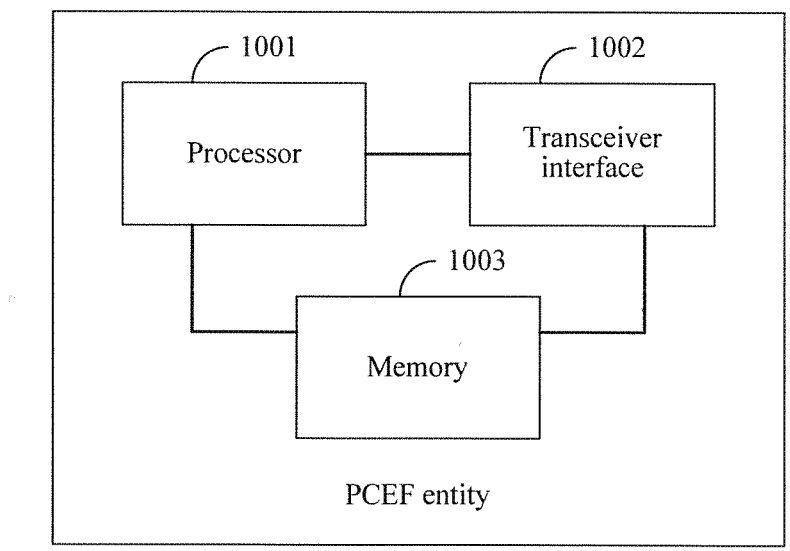
FIG. 10 is a schematic diagram of a PCEF entity according to an embodiment of the present invention.

In addition, this embodiment of the present invention further provides a policy and charging enforcement function entity, that is, a PCEF entity. As shown in FIG. 10, the PCEF entity may include a processor 1001, a transceiver interface 1002, and a memory 1003 configured to store data.

The processor 1001 is configured to: control the transceiver interface 1002 to send an adjustment request to a PCRF entity, where the adjustment request indicates a participant mobile network operator to which user equipment belongs, and requests to adjust a GBR quota and/or an MBR quota of the participant mobile network operator in the policy and charging enforcement function PCEF entity; and adjust the GBR quota and/or the MBR quota according to an adjustment response received by the transceiver interface 1002.

The MBR quota is a sum of MBR resources that are in the PCEF entity and that can be used by all GBR resource bearers of the participant mobile network operator; the GBR quota is a sum of GBR resources that are in the PCEF entity and that can be used by all the GBR resource bearers of the participant mobile network operator.

The transceiver interface 1002 is configured to: receive the adjustment response that is from the PCRF entity according to the adjustment request, where the adjustment response indicates whether the PCEF entity is allowed to adjust the GBR quota and/or the MBR quota; and provide the adjustment response to the processor 1001. For example, details may be as follows:

if the adjustment response indicates adjustment by the PCEF entity is allowed, the processor 1001 may increase the GBR quota and/or the MBR quota; or if the adjustment response indicates that adjustment by the PCEF entity is not allowed, the processor 1001 adjusts, to a GBR (that is, a GBR of a GBR bearer), an actual used bit rate of the GBR bearer whose current actual used bit rate is greater than the GBR (that is, the GBR of the GBR bearer); or if the adjustment response indicates that adjustment by the PCEF entity is not allowed, and the processor 1001 determines that a current actual used bit rate of each GBR bearer in the PCEF entity has not exceeded a GBR corresponding to the GBR bearer (that is, a GBR of the GBR bearer), but a sum of the current actual used bit rates of all the GBR bearers has exceeded a second preset threshold, when a new bit rate bearer needs to be established, the processor 1001 preempts a bit rate bearer resource for the new bit rate bearer according to an ARP parameter.

The second preset threshold may be set according to an actual application requirement, and details are not described herein.

After adjusting the GBR quota and/or the MBR quota, the PCEF entity may perform management and control for a GBR bearer of the participant mobile network operator according to the GBR quota and/or the MBR quota, for example, according to the adjusted GBR quota and/or MBR quota, determine whether establishment of a new GBR bearer is allowed, and how to allocate a GBR bearer resource to the new GBR bearer. Details are not described herein.

During specific implementation, the PCEF entity may determine, according to usage of a GBR bearer resource of the PCEF entity, whether to initiate an adjustment request, that is, the processor 1001 may be further configured to: before controlling the transceiver interface 1002 to send the adjustment request to the PCRF entity, determine that a sum of MBRs currently used by all GBR bearers of the PCEF entity has not exceeded a first preset threshold, and a sum of MBRs currently used by all the GBR bearers of the participant mobile network operator in the PCEF entity has reached the MBR quota (that is, the MBR quota of the participant mobile network operator in the PCEF entity).

That is, only when determining that the sum of the MBRs currently used by all the GBR bearers of the PCEF entity has not exceeded the first preset threshold, and the sum of the MBRs currently used by all the GBR bearers of the participant mobile network operator in the PCEF entity has reached the MBR quota, the processor 1001 controls the transceiver interface 1002 to send the adjustment request to the PCRF entity.

It should be noted that, if the processor 1001 determines that the sum of the MBRs currently used by all the GBR bearers of the PCEF entity has exceeded the first preset threshold, the processor 1001 may adjust, to the GBR quota, a sum of MBRs of all the GBR bearers of the participant mobile network operator to which the user equipment belongs, and adjust, to a GBR (that is, a GBR of a GBR bearer), an actual used bit rate of the GBR bearer whose current actual used bit rate is greater than the GBR (that is, the GBR of the GBR bearer); and if the processor 1001 determines that the sum of the MBRs currently used by all the GBR bearers of the PCEF entity has exceeded the first preset threshold, a current actual used bit rate of each GBR bearer has not exceeded a GBR corresponding to the GBR bearer (that is, a GBR of the GBR bearer), and a sum of the current actual used bit rates of all the GBR bearers has exceeded a second preset threshold, when a new GBR bearer needs to be established, the processor 1001 preempts a bit rate bearer resource for the new GBR bearer according to an ARP parameter.

In addition, before sending the adjustment request to the PCRF entity, the PCEF entity may further provide the usage of the GBR resource of the PCEF entity to the PCRF entity, so that the PCRF entity collects statistics, to determine the used GBR resource of the participant mobile network operator. Details may be as follows:

(1) In a case in which the PCEF entity initiates a session termination procedure:

The transceiver interface 1002 may be further configured to receive a session termination request from the user equipment, and send a session termination indication to the PCRF entity according to the session termination request, where the session termination indication carries a user identifier of the user equipment and GBR bearer information.

The user identifier of the user equipment may be an IMSI, an MSIN, or the like. A corresponding identifier such as a PMNO ID or an APN may be found through search according to the user identifier, to determine the participant mobile network operator to which the user equipment belongs.

The GBR bearer information may include a bearer quantity and type, for example, whether a bearer is a GBR bearer or a non-GBR bearer, and if the bearer is a GBR bearer, may include a specific value of a parameter such as a GBR and/or an MBR.

(2) In a case in which the PCEF entity initiates a session modification procedure:

The transceiver interface 1002 may be further configured to: send a first session modification indication to the PCRF entity, and receive a first session modification response that is returned by the PCRF entity and that includes a new PCC rule, where the new PCC rule is set by the PCRF entity according to the first session modification indication; and send, under the control of the processor 1001, a first session modification result notification to the PCRF entity.

The processor 1001 may be further configured to: modify a current GBR bearer according to the new PCC rule, generate the first session modification result notification, and control the transceiver interface 1002 to send the first session modification result notification to the PCRF entity, where the first session modification result notification carries a user identifier of the user equipment and GBR bearer information.

The user identifier of the user equipment may be an IMSI, an MSIN, or the like. A corresponding identifier such as a PMNO ID or an APN may be found through search according to the user identifier, to determine the participant mobile network operator to which the user equipment belongs. The GBR bearer information may include a bearer quantity and type, for example, whether a bearer is a GBR bearer or a non-GBR bearer, and if the bearer is a GBR bearer, may include a specific value of a parameter such as a GBR and/or an MBR.

The first session modification indication is used to indicate establishment, deletion, update, or the like of a GBR bearer. The operation of modifying, by the processor 1001, a current GBR bearer according to the new PCC rule may be specifically as follows:

if the first session modification response indicates that a GBR bearer can be established, executing a GBR bearer establishment procedure according to the new PCC rule; or if the first session modification response indicates that a GBR bearer can be deleted, executing a GBR bearer deletion procedure according to the new PCC rule; or if the first session modification response indicates that a GBR bearer can be updated, when it is determined that a bearer service quality parameter does not need to be updated, executing a GBR bearer update procedure according to the new PCC rule; or if the first session modification response indicates that a GBR bearer can be established when it is determined that the allocation and retention priority ARP parameter included in the new PCC rule enables the user equipment to preempt an existing bearer resource and an MBR of a required bearer resource is less than an MBR of the preempted bearer resource, when it is determined that the ARP parameter included in the new PCC rule enables the user equipment to preempt an existing bearer resource and an MBR of a required bearer resource is less than an MBR of the preempted bearer resource, executing a GBR bearer establishment procedure, or otherwise, rejecting GBR bearer establishment; or if the first session modification response indicates that a GBR bearer can be updated when it is determined that a bearer service quality parameter does not need to be updated and an MBR is not to be increased, when it is determined that a bearer service quality parameter does not need to be updated and an MBR is not to be increased, executing a bearer update procedure according to the new PCC rule.

(3) In a case in which the PCRF entity initiates a session modification procedure:

The transceiver interface 1002 may be further configured to: receive a second session modification indication that is from the PCRF entity and that carries a new PCC rule, where the new PCC rule is set by the PCRF entity according to a current network status; and send, under the control of the processor 1001, a second session modification result notification to the PCRF entity.

The processor 1001 may be further configured to: modify a current GBR bearer according to the new PCC rule, generate the second session modification result notification, and control the transceiver interface 1001 to send the second session modification result notification to the PCRF entity, where the second session modification result notification carries a user identifier of the user equipment and GBR bearer information.

The user identifier of the user equipment may be an IMSI, an MSIN, or the like. A corresponding identifier such as a PMNO ID or an APN may be found through search according to the user identifier, to determine the participant mobile network operator to which the user equipment belongs. The GBR bearer information may include a bearer quantity and type, for example, whether a bearer is a GBR bearer or a non-GBR bearer, and if the bearer is a GBR bearer, may include a specific value of a parameter such as a GBR and/or an MBR.

The second session modification indication is used to indicate establishment, deletion, update, or the like of a GBR bearer. The operation of modifying, by the processor 1001, a current GBR bearer according to the new PCC rule may be specifically as follows:

if the second session modification indication indicates that a GBR bearer can be established, executing a GBR bearer establishment procedure according to the new PCC rule; or if the second session modification indication indicates that a GBR bearer can be deleted, executing a GBR bearer deletion procedure according to the new PCC rule; or if the second session modification indication indicates that a GBR bearer can be updated, when it is determined that a bearer service quality parameter does not need to be updated, executing a GBR bearer update procedure according to the new PCC rule; or if the second session modification indication indicates that a GBR bearer can be established when it is determined that the allocation and retention priority ARP parameter included in the new PCC rule enables the user equipment to preempt an existing bearer resource and an MBR of a required bearer resource is less than an MBR of the preempted bearer resource, when it is determined that the ARP parameter included in the new PCC rule enables the user equipment to preempt an existing bearer resource and an MBR of a required bearer resource is less than an MBR of the preempted bearer resource, executing a GBR bearer establishment procedure, or otherwise, rejecting GBR bearer establishment; or if the second session modification indication indicates that a GBR bearer can be updated when it is determined that a bearer service quality parameter does not need to be updated and an MBR is not to be increased, when it is determined that a bearer service quality parameter does not need to be updated and an MBR is not to be increased, executing a GBR bearer update procedure according to the new PCC rule.

During specific implementation, the units may be implemented as independent units, or may be combined arbitrarily to be implemented as one or more entities. For specific implementation of the units, refer to other embodiments. Details are not described herein.

In addition, it should be noted that, during specific implementation, the PCEF entity may be implemented as an independent entity, or may be integrated in a gateway, for example, a device such as a P-GW.

It can be seen from above that, the PCEF entity in this embodiment may send an adjustment request to a PCRF entity, where the adjustment request indicates a participant mobile network operator to which user equipment belongs, and requests to adjust a GBR quota and/or an MBR quota of the participant mobile network operator in the PCEF entity, then receive an adjustment response that is from the PCRF entity according to the adjustment request, and then adjust, according to the adjustment response, the GBR quota and/or the MBR quota of the participant mobile network operator to which the user equipment belongs in the PCEF entity. According to the solution, it can be determined, according to specific statuses of the subscription GBR resource of the participant mobile network operator and the used GBR resource of the participant mobile network operator, whether a GBR quota and/or an MBR quota of the participant mobile network operator in a PCEF entity can be adjusted. Therefore, compared with the prior art in which the GBR quota and/or the MBR quota are fixed, management and control can be performed for a GBR resource more flexibly and precisely, and precision and a control effect of resource management are greatly improved, so that a resource in a shared network can be fully used.

A person of ordinary skill in the art may understand that all or some of the steps of the methods in the embodiments may be implemented by a program instructing relevant hardware. The program may be stored in a computer-readable storage medium. The storage medium may include: a read-only memory (ROM), a random access memory (RAM), a magnetic disk, or an optical disc.

A system, an apparatus, and a corresponding method for managing a resource in a shared network provided in the embodiments of the present invention are described above in detail. Specific examples are used in this specification to describe the principle and implementation manners of the present invention. The descriptions of the foregoing embodiments are merely intended to help understand the method and core idea of the present invention. In addition, a person skilled in the art may, according to the idea of the present invention, make modifications with respect to the specific implementation manners and the application scope. Therefore, the content of this specification shall not be construed as a limitation on the present invention.

What is claimed is:

1. A method for managing a resource in a shared network, the method comprising:
   receiving an adjustment request from a policy and charging enforcement function (PCEF) entity, wherein the adjustment request indicates a participant mobile network operator to which user equipment belongs, and requests to adjust a guaranteed bit rate quota and/or a maximum bit rate quota of the participant mobile network operator in the PCEF entity, the maximum bit rate quota is a sum of maximum bit rate resources that are in the PCEF entity and that can be used by all guaranteed bit rate bearers of the participant mobile network operator, and the guaranteed bit rate quota is a sum of guaranteed bit rate resources that are in the PCEF entity and that can be used by all the guaranteed bit rate bearers of the participant mobile network operator;
   obtaining, according to the adjustment request, a subscription guaranteed bit rate resource allocated by a primary operator to the participant mobile network operator and a used guaranteed bit rate resource of the participant mobile network operator, wherein the used guaranteed bit rate resource is a sum of guaranteed bit rate resources currently used by all the guaranteed bit rate bearers of the participant mobile network operator, and the subscription guaranteed bit rate resource is a sum of guaranteed bit rate resources that can be used by all the guaranteed bit rate bearers of the participant mobile network operator at any moment; and
   sending an adjustment response to the PCEF entity according to the subscription guaranteed bit rate resource and the used guaranteed bit rate resource, wherein the adjustment response indicates whether the PCEF entity is allowed to adjust the guaranteed bit rate quota and/or the maximum bit rate quota.

2. The method according to claim 1, wherein sending the adjustment response comprises:
   when the used guaranteed bit rate resource is less than the subscription guaranteed bit rate resource, sending, to the PCEF entity, an adjustment response indicating that the PCEF entity is allowed to adjust the guaranteed bit rate quota and/or the maximum bit rate quota; or
   when the used guaranteed bit rate resource is equal to the subscription guaranteed bit rate resource, sending, to the PCEF entity, an adjustment response indicating that the PCEF entity is not allowed to adjust the guaranteed bit rate quota and/or the maximum bit rate quota.

3. The method according to claim 1, wherein before receiving the adjustment request, the method further comprises:
   receiving a session termination indication from the PCEF entity, wherein the session termination indication carries a user identifier of the user equipment and guaranteed bit rate bearer information;
   determining, according to the user identifier of the user equipment, the participant mobile network operator to which the user equipment belongs; and
   updating, according to the guaranteed bit rate bearer information, the used guaranteed bit rate resource of the participant mobile network operator to which the user equipment belongs.

4. The method according to claim 1, wherein before receiving the adjustment request, the method further comprises:
   receiving a first session modification indication from the PCEF entity;
   setting a new policy and charging control (PCC) rule according to the first session modification indication;
   returning, to the PCEF entity, a first session modification response carrying the new PCC rule, so that the PCEF entity modifies a current guaranteed bit rate bearer according to the new PCC rule;
   receiving a first session modification result notification from the PCEF entity, wherein the first session modification result notification carries a user identifier of the user equipment and guaranteed bit rate bearer information;
   determining, according to the user identifier of the user equipment, the participant mobile network operator to which the user equipment belongs; and
   updating, according to the guaranteed bit rate bearer information, the used guaranteed bit rate resource of the participant mobile network operator to which the user equipment belongs.

5. The method according to claim 1, wherein before receiving the adjustment request, the method further comprises:
   setting a new policy and charging control (PCC) rule according to a current network status;
   sending, to the PCEF entity, a second session modification indication carrying the new PCC rule, so that the PCEF entity modifies a current guaranteed bit rate bearer according to the new PCC rule;
   receiving a second session modification result notification from the PCEF entity, wherein the second session modification result notification carries a user identifier of the user equipment and guaranteed bit rate bearer information;
   determining, according to the user identifier of the user equipment, the participant mobile network operator to which the user equipment belongs; and
   updating, according to the guaranteed bit rate bearer information, the used guaranteed bit rate resource of the participant mobile network operator to which the user equipment belongs.

6. A method for managing a resource in a shared network, the method comprising:
   sending, by a policy and charging enforcement function (PCEF) entity, an adjustment request to a policy and charging rule function (PCRF) entity, wherein the adjustment request indicates a participant mobile network operator to which user equipment belongs, and requests to adjust a guaranteed bit rate quota and/or a maximum bit rate quota of the participant mobile network operator in the PCEF entity, the maximum bit rate quota is a sum of quantities of maximum bit rate resources that are in the PCEF entity and that can be used by all guaranteed bit rate bearers of the participant mobile network operator, and the guaranteed bit rate quota is a sum of guaranteed bit rate resources that are in the PCEF entity and that can be used by all the guaranteed bit rate bearers of the participant mobile network operator;

receiving, by the PCEF entity, an adjustment response that is from the PCRF entity according to the adjustment request, wherein the adjustment response indicates whether the PCEF entity is allowed to adjust the guaranteed bit rate quota and/or the maximum bit rate quota; and adjusting, by the PCEF entity, the guaranteed bit rate quota and/or the maximum bit rate quota according to the adjustment response.

7. The method according to claim 6, wherein before sending the adjustment request, the method further comprises:

determining, by the PCEF entity, that a sum of maximum bit rates currently used by all guaranteed bit rate bearers of the PCEF entity has not exceeded a first preset threshold, and a sum of maximum bit rates currently used by all the guaranteed bit rate bearers of the participant mobile network operator in the PCEF entity has reached the maximum bit rate quota.

8. The method according to claim 6, wherein adjusting the guaranteed bit rate quota and/or the maximum bit rate quota comprises:

when the adjustment response indicates that adjustment by the PCEF entity is allowed, increasing, by the PCEF entity, the guaranteed bit rate quota and/or the maximum bit rate quota; or when the adjustment response indicates that adjustment by the PCEF entity is not allowed, adjusting, by the PCEF entity to a guaranteed bit rate, an actual used bit rate of a guaranteed bit rate bearer whose current actual used bit rate is greater than the guaranteed bit rate; or when the adjustment response indicates that adjustment by the PCEF entity is not allowed, and a current actual used bit rate of each guaranteed bit rate bearer in the PCEF entity has not exceeded a guaranteed bit rate corresponding to the guaranteed bit rate bearer, but a sum of the current actual used bit rates of all the guaranteed bit rate bearers has exceeded a second preset threshold, when a new guaranteed bit rate bearer needs to be established, preempting a bit rate bearer resource for the new guaranteed bit rate bearer according to an allocation and retention priority (ARP) parameter.

9. The method according to claim 7, further comprising:
when the PCEF entity determines that the sum of the maximum bit rates currently used by all the guaranteed bit rate bearers of the PCEF entity has exceeded the first preset threshold, adjusting, by the PCEF entity to the guaranteed bit rate quota, a sum of maximum bit rates of all the guaranteed bit rate bearers of the participant mobile network operator to which the user equipment belongs, adjusting, to a guaranteed bit rate, an actual used bit rate of a guaranteed bit rate bearer whose current actual used bit rate is greater than the guaranteed bit rate, and when a current actual used bit rate of each guaranteed bit rate bearer has not exceeded a guaranteed bit rate corresponding to the guaranteed bit rate bearer, but a sum of the current actual used bit rates of all the guaranteed bit rate bearers has exceeded a second preset threshold, when a new guaranteed bit rate bearer needs to be established, preempting a bit rate bearer resource for the new guaranteed bit rate bearer according to an allocation and retention priority (ARP) parameter.

10. The method according to claim 6, wherein before sending the adjustment request, the method further comprises:

receiving, by the PCEF entity, a session termination request from the user equipment; and sending, by the PCEF entity, a session termination indication to the PCRF entity according to the session termination request, wherein the session termination indication carries a user identifier of the user equipment and guaranteed bit rate bearer information.

11. The method according to claim 6, wherein before sending the adjustment request, the method further comprises:

sending, by the PCEF entity, a first session modification indication to the PCRF entity;

receiving, by the PCEF entity, a first session modification response that is returned by the PCRF entity and that comprises a new policy and charging control (PCC) rule, wherein the new PCC rule is set by the PCRF entity according to the first session modification indication;

modifying, by the PCEF entity, a current guaranteed bit rate bearer according to the new PCC rule; and sending, by the PCEF entity, a first session modification result notification to the PCRF entity, wherein the first session modification result notification carries a user identifier of the user equipment and guaranteed bit rate bearer information.

12. The method according to claim 11, wherein modifying the current bearer comprises:

if the first session modification response indicates that a guaranteed bit rate bearer can be established, executing, by the PCEF entity, a guaranteed bit rate bearer establishment procedure according to the new PCC rule; or if the first session modification response indicates that a guaranteed bit rate bearer can be deleted, executing, by the PCEF entity, a guaranteed bit rate bearer deletion procedure according to the new PCC rule; or if the first session modification response indicates that a guaranteed bit rate bearer can be updated, when it is determined that a bearer service quality parameter does not need to be updated, executing, by the PCEF entity, a guaranteed bit rate bearer update procedure according to the new PCC rule; or if the first session modification response indicates that a guaranteed bit rate bearer can be established when it is deter mined that the allocation and retention priority (ARP) parameter comprised in the new PCC rule enables the user equipment to preempt an existing bearer resource and a maximum bit rate of a required bearer resource is less than a maximum bit rate of the preempted bearer resource, when it is determined that the ARP parameter comprised in the new PCC rule enables the user equipment to preempt an existing bearer resource and a maximum bit rate of a required bearer resource is less than a maximum bit rate of the preempted bearer resource, executing a guaranteed bit rate bearer establishment procedure, or otherwise, rejecting guaranteed bit rate bearer establishment; or if the first session modification response indicates that a guaranteed bit rate bearer can be updated when it is determined that a bearer service quality parameter does not need to be updated and a maximum bit rate is not to be increased, when it is determined that a bearer service quality parameter does not need to be updated and a maximum bit rate is not to be increased, executing a bearer update procedure according to the new PCC rule.

13. The method according to claim 6, wherein before sending the adjustment request, the method further comprises:
receiving, by the PCEF entity, a second session modification indication that is from the PCRF entity and that carries a new policy and charging control PCC rule, wherein the new PCC rule is set by the PCRF entity according to a current network status;
modifying, by the PCEF entity, a current bearer according to the new PCC rule; and
sending, by the PCEF entity, a second session modification result notification to the PCRF entity, wherein the second session modification result notification carries a user identifier of the user equipment and guaranteed bit rate bearer information.

14. The method according to claim 13, wherein modifying the current bearer comprises:
if the second session modification indication indicates that a guaranteed bit rate bearer can be established, executing, by the PCEF entity, a guaranteed bit rate bearer establishment procedure according to the new PCC rule; or
if the second session modification indication indicates that a guaranteed bit rate bearer can be deleted, executing, by the PCEF entity, a guaranteed bit rate bearer deletion procedure according to the new PCC rule; or
if the second session modification indication indicates that a guaranteed bit rate bearer can be updated, when it is determined that a bearer service quality parameter does not need to be updated, executing, by the PCEF entity, a guaranteed bit rate bearer update procedure according to the new PCC rule; or
if the second session modification indication indicates that a guaranteed bit rate bearer can be established when it is determined that the allocation and retention priority (ARP) parameter comprised in the new PCC rule enables the user equipment to preempt an existing bearer resource and a maximum bit rate of a required bearer resource is less than a maximum bit rate of the preempted bearer resource, when it is determined that the ARP parameter comprised in the new PCC rule enables the user equipment to preempt an existing bearer resource and a maximum bit rate of a required bearer resource is less than a maximum bit rate of the preempted bearer resource, executing a guaranteed bit rate bearer establishment procedure, or otherwise, rejecting guaranteed bit rate bearer establishment; or
if the second session modification indication indicates that a guaranteed bit rate bearer can be updated when it is determined that a bearer service quality parameter does not need to be updated and a maximum bit rate is not to be increased, when it is determined that a bearer service quality parameter does not need to be updated and a maximum bit rate is not to be increased, executing a guaranteed bit rate bearer update procedure according to the new PCC rule.

15. A policy and charging rule function entity, comprising:
a processor;
a transceiver interface; and
a memory configured to store data; wherein
the transceiver interface is configured to:
receive an adjustment request from a policy and charging enforcement function (PCEF) entity, and provide the adjustment request to the processor, wherein the adjustment request indicates a participant mobile network operator to which user equipment belongs, and requests to adjust a guaranteed bit rate quota and/or a maximum bit rate quota of the participant mobile network operator in the PCEF entity, the maximum bit rate quota is a sum of maximum bit rate resources that are in the PCEF entity and that can be used by all guaranteed bit rate bearers of the participant mobile network operator, and the guaranteed bit rate quota is a sum of guaranteed bit rate resources that are in the PCEF entity and that can be used by all the guaranteed bit rate bearers of the participant mobile network operator; and
send, under the control of the processor, an adjustment response to the PCEF entity according to subscription guaranteed bit rate resource and used guaranteed bit rate resource, wherein the adjustment response indicates whether the PCEF entity is allowed to adjust the guaranteed bit rate quota and/or the maximum bit rate quota; and
the processor is configured to:
obtain the subscription guaranteed bit rate resource allocated by a primary operator to the participant mobile network operator and the used guaranteed bit rate resource of the participant mobile network operator, wherein the used guaranteed bit rate resource is a sum of guaranteed bit rate resources currently used by all the guaranteed bit rate bearers of the participant mobile network operator, and the subscription guaranteed bit rate resource is a sum of guaranteed bit rate resources that can be used by all the guaranteed bit rate bearers of the participant mobile network operator at any moment; and
generate the adjustment response according to the subscription guaranteed bit rate resource and the used guaranteed bit rate resource, and control the transceiver interface to send the adjustment response to the PCEF entity.

16. The policy and charging rule function entity according to claim 15, wherein
the processor is configured to:
when the used guaranteed bit rate resource is less than the subscription guaranteed bit rate resource, generate an adjustment response indicating that the PCEF entity is allowed to adjust the guaranteed bit rate quota and/or the maximum bit rate quota; or
when the used guaranteed bit rate resource is equal to the subscription guaranteed bit rate resource, generate an adjustment response indicating that the PCEF entity is not allowed to adjust the guaranteed bit rate quota and/or the maximum bit rate quota.

17. A policy and charging enforcement function (PCEF) entity, comprising:
a processor;
a transceiver interface; and
a memory configured to store data; wherein
the processor is configured to:
control the transceiver interface to send an adjustment request to a policy and charging rule function (PCRF) entity, wherein the adjustment request indicates a participant mobile network operator to which user equipment belongs, and requests to adjust a guaranteed bit rate quota and/or a maximum bit rate quota of the participant mobile network operator in the PCEF entity, the maximum bit rate quota is a sum of quantities of maximum bit rate resources that are in the PCEF entity and that can be used by all guaranteed bit rate bearers of the participant mobile network operator, and the guaranteed bit rate quota is a sum of guaranteed bit rate resources that are in the PCEF entity and that can be used by all the guaranteed bit rate bearers of the participant mobile network operator; and adjust the guaranteed bit rate quota and/or the maximum bit rate quota according to an adjustment response received by the transceiver interface; and the transceiver interface is configured to:
receive the adjustment response that is from the PCRF entity according to the adjustment request, wherein the adjustment response indicates whether the PCEF entity is allowed to adjust the guaranteed bit rate quota and/or the maximum bit rate quota; and
provide the adjustment response to the processor.

18. The policy and charging enforcement function entity according to claim 17, wherein
the processor is further configured to:
before controlling the transceiver interface to send the adjustment request to the PCRF entity, determine that a sum of maximum bit rates currently used by all guaranteed bit rate bearers of the PCEF entity has not exceeded a first preset threshold, and a sum of maximum bit rates currently used by all the guaranteed bit rate bearers of the participant mobile network operator in the PCEF entity has reached the maximum bit rate quota.

19. The policy and charging enforcement function entity according to claim 17, wherein the processor is configured to:
when the adjustment response indicates that adjustment by the PCEF entity is allowed, increase the guaranteed bit rate quota and/or the maximum bit rate quota; or
when the adjustment response indicates that adjustment by the PCEF entity is not allowed, adjust, to a guaranteed bit rate, an actual used bit rate of a guaranteed bit rate bearer whose current actual used bit rate is greater than the guaranteed bit rate; or when the adjustment response indicates that adjustment by the PCEF entity is not allowed, and a current actual used bit rate of each guaranteed bit rate bearer in the PCEF entity has not exceeded a guaranteed bit rate corresponding to the guaranteed bit rate bearer, but a sum of the current actual used bit rates of all the guaranteed bit rate bearers has exceeded a second preset threshold, and when a new guaranteed bit rate bearer needs to be established, preempt a bit rate bearer resource for the new guaranteed bit rate bearer according to an allocation and retention priority (ARP) parameter.

20. The policy and charging enforcement function entity according to claim 17, wherein the processor is further configured to:
when it is determined that the sum of the maximum bit rates currently used by all the guaranteed bit rate bearers of the PCEF entity has exceeded the first preset threshold:
adjust, to the guaranteed bit rate quota, a sum of maximum bit rates of all the guaranteed bit rate bearers of the participant mobile network operator to which the user equipment belongs,
adjust, to a guaranteed bit rate, an actual used bit rate of a guaranteed bit rate bearer whose current actual used bit rate is greater than the guaranteed bit rate, and
when a current actual used bit rate of each guaranteed bit rate bearer has not exceeded a guaranteed bit rate corresponding to the guaranteed bit rate bearer, but a sum of the current actual used bit rates of all the guaranteed bit rate bearers has exceeded a second preset threshold, and when a new guaranteed bit rate bearer needs to be established, preempt a bit rate bearer resource for the new guaranteed bit rate bearer according to an allocation and retention priority (ARP) parameter.

* * * * *